(12) United States Patent
Yoshida et al.

(10) Patent No.: US 11,891,533 B2
(45) Date of Patent: Feb. 6, 2024

(54) METAL-MICROPARTICLE-CONTAINING INK

(71) Applicant: KAO CORPORATION, Tokyo (JP)

(72) Inventors: Tomohide Yoshida, Wakayama (JP); Kosuke Muto, Sakai (JP)

(73) Assignee: KAO CORPORATION, Tokyo (JP)

( * ) Notice: Subject to any disclaimer, the term of this patent is extended or adjusted under 35 U.S.C. 154(b) by 274 days.

(21) Appl. No.: 17/605,805

(22) PCT Filed: Apr. 26, 2019

(86) PCT No.: PCT/JP2019/018098
§ 371 (c)(1),
(2) Date: Oct. 22, 2021

(87) PCT Pub. No.: WO2020/217502
PCT Pub. Date: Oct. 29, 2020

(65) Prior Publication Data
US 2022/0204801 A1 Jun. 30, 2022

(51) Int. Cl.

| | |
|---|---|
| *C09D 11/52* | (2014.01) |
| *B41M 5/00* | (2006.01) |
| *C09D 11/033* | (2014.01) |
| *C09D 11/037* | (2014.01) |
| *C09D 11/102* | (2014.01) |
| *C09D 11/322* | (2014.01) |
| *C09D 11/36* | (2014.01) |

(52) U.S. Cl.
CPC ........... *C09D 11/52* (2013.01); *B41M 5/0023* (2013.01); *C09D 11/033* (2013.01); *C09D 11/037* (2013.01); *C09D 11/102* (2013.01); *C09D 11/322* (2013.01); *C09D 11/36* (2013.01)

(58) Field of Classification Search
CPC .. B41M 5/0023; C09D 11/033; C09D 11/037; C09D 11/102; C09D 11/322; C09D 11/326; C09D 11/36; C09D 11/52
See application file for complete search history.

(56) References Cited

U.S. PATENT DOCUMENTS

2015/0098165 A1* 4/2015 Suzuki ................... H01G 4/012
252/514
2015/0166810 A1 6/2015 Fu et al.
2016/0297982 A1 10/2016 Hinotsu et al.
2017/0120394 A1 5/2017 Shingai et al.
2018/0030297 A1* 2/2018 Oda ..................... C09D 11/52
2018/0056692 A1 3/2018 Tomura et al.
2021/0379654 A1 12/2021 Yoshida et al.

FOREIGN PATENT DOCUMENTS

| CN | 109390073 A | 2/2019 |
|---|---|---|
| EP | 2 883 922 A1 | 6/2015 |
| EP | 3 865 230 A1 | 8/2021 |
| JP | 2009-149888 A | 7/2009 |
| JP | 2013-67703 A | 4/2013 |
| JP | 2013-69475 A | 4/2013 |
| JP | 2015-49988 A | 3/2015 |
| JP | 2015-69752 A | 4/2015 |
| JP | 2015-206108 A | 11/2015 |
| JP | 2016-164312 A | 9/2016 |
| JP | 2017-2219 A | 1/2017 |
| JP | 2018-34500 A | 3/2018 |
| JP | 2018-37340 A | 3/2018 |
| JP | 2019-38893 A | 3/2019 |
| WO | WO 2019/022239 A1 | 1/2019 |

OTHER PUBLICATIONS

Extended European Search Report dated Nov. 7, 2022, in corresponding European Patent Application No. 19926390.6, 7 pages.
International Search Report dated Jun. 4, 2019 in PCT/JP2019/018098 filed on Apr. 26, 2019, 2 pages.

* cited by examiner

*Primary Examiner* — Mark Kopec
*Assistant Examiner* — Jaison P Thomas
(74) *Attorney, Agent, or Firm* — Oblon, McClelland, Maier & Neustadt, L.L.P.

(57) ABSTRACT

The present invention relates to a metal fine particle-containing ink containing metal fine particles (a) dispersed therein with a polymer B, in which the ink contains an ink solvent S; a difference ΔSP (|SP(S)−SP(B)|) between solubility parameters of the solvent S and the polymer B is not more than 1.5 $(cal/cm^3)^{0.5}$ wherein SP(S) and SP(B) are a solubility parameter of the ink solvent S and a solubility parameter of the polymer B, respectively, as measured by a Fedors method; and the SP(B) is not less than 9.5 $(cal/cm^3)^{0.5}$ and not more than 10.5 $(cal/cm^3)^{0.5}$, as well as a method for producing a printed material, which includes the step of applying the metal fine particle-containing ink to a printing substrate to form a metal coating film of the ink on the printing substrate under ordinary-temperature environments, thereby obtaining the printed material.

19 Claims, No Drawings

METAL-MICROPARTICLE-CONTAINING INK

FIELD OF THE INVENTION

The present invention relates to a metal fine particle-containing ink and a method for producing a printed material using the ink.

BACKGROUND OF THE INVENTION

Metal fine particles obtained by atomizing a metal into fine particles having a nano-order size are capable of exhibiting a variety of functions and properties upon use, and therefore a wide variety of studies have been made to use the metal fine particles in extensive industrial applications.

It is known that the metal fine particles are capable of providing a design having a metallic luster when used in printing. With the spread of printing application fields including commercial printing, industrial printing, etc., for packaging of goods, advertisements, etc., studies have been made to improve properties of an ink containing the metal fine particles.

For example, JP 2017-2219A (Patent Literature 1) aims at providing a liquid composition for formation of a silver mirror film layer which is capable of forming a silver mirror film layer under ordinary temperature conditions for a short period of time without heating, and a method of forming a silver mirror film layer using the liquid composition, and discloses a liquid composition for formation of a silver mirror film layer, which includes a dispersion solution of silver nanoparticles, the liquid composition being obtained by irradiating an ultrasonic wave to an alcohol solution prepared by dissolving a polymer dispersant in an alcohol solvent and dispersing at least one silver compound selected from the group consisting of silver oxide and silver carbonate in the resulting solution, and a method of forming a silver mirror film layer using the liquid composition.

In addition, in printed electronics technologies in which an electronic device is manufactured by printing technologies, attempts have also been made to utilize an ink containing the metal fine particles for producing wirings, electrodes, etc.

For example, JP 2009-149888A (Patent Literature 2) aims at maximizing dispersibility of a metal ink, and discloses a metal ink containing metal nanoparticles that are capped with a capping material, and an organic solvent having a solubility parameter capable of swelling the capping material.

JP 2013-67703A (Patent Literature 3) aims at providing a printing ink that is capable of printing images of wirings, electric circuits, etc., which have a metallic luster and are excellent in electrical conductivity and rub fastness onto a printing medium having no heat resistance even without heating, and discloses a printing ink that is applied onto a printing medium whose 75° specular gloss as prescribed in JIS-Z8741 is not less than 60% to print images thereon, and contains metal fine particles, a high-molecular dispersing resin for dispersing the metal fine particles, a water-soluble organic solvent and a surfactant, in which a surface tension of the printing ink and a coefficient of permeability of the ink to the printing medium as measured by a Bristow method fall within respective predetermined ranges.

SUMMARY OF THE INVENTION

The present invention relates to a metal fine particle-containing ink containing metal fine particles (a) dispersed therein with a polymer B, in which:

the ink contains a solvent S;
a difference $\Delta SP$ ($|SP(S)-SP(B)|$) between solubility parameters of the solvent S and the polymer B is not more than 1.5 $(cal/cm^3)^{0.5}$ wherein $SP(S)$ and $SP(B)$ are a solubility parameter of the solvent S and a solubility parameter of the polymer B, respectively, as measured by a Fedors method; and
the $SP(B)$ is not less than 9.5 $(cal/cm^3)^{0.5}$ and not more than 10.5 $(cal/cm^3)^{0.5}$.

DETAILED DESCRIPTION OF THE INVENTION

Hitherto, in the case where a metal coating film is produced from an ink containing metal fine particles, there has been adopted the method of sintering the metal fine particles under high-temperature conditions. However, with the spread of applications of a printed material on which the metal coating film is formed, it has been required to use a substrate having a low heat resistance, etc., therein. Thus, it has been demanded to provide a metal fine particle-containing ink that allows metal fine particles contained therein to undergo accelerated sintering even when producing a metal coating film therefrom under ordinary-temperature environments to thereby obtain a printed material that is excellent in electrical conductivity.

Also, in general, when storing the printed material on which the metal coating film is formed under high-temperature and high-humidity conditions, the metal coating film tends to be deteriorated in electrical conductivity owing to oxidation of a metal in the metal coating film, etc. For this reason, it has been required to suppress deterioration in electrical conductivity of the metal coating film after storing the printed material under high-temperature and high-humidity conditions.

The technology described in the Patent Literature 1 aims at forming a silver mirror film on various metallic coating products such as automobiles, etc., and therefore in the Patent Literature 1, there have been made no studies on improvement of electrical conductivity thereof. In the technology described in the Patent Literature 2, although the resulting printed material is improved in electrical conductivity immediately after printing, there tends to occur such a problem that the printed material is deteriorated in electrical conductivity after being stored under high-temperature and high-humidity conditions. In addition, the technology described in the Patent Literature 3 has failed to impart sufficient electrical conductivity to the resulting printed material.

The present invention relates to a metal fine particle-containing ink that is capable of providing a printed material that has ordinary-temperature sintering properties of metal fine particles therein, can exhibit high electrical conductivity immediately after printing and can maintain the high electrical conductivity even after being stored under high-temperature and high-humidity conditions, and a method for producing a printed material using the metal fine particle-containing ink.

Meanwhile, in the present invention, the term "ordinary-temperature sintering properties" as used herein means that the metal fine particles undergo necking therebetween and are bonded to each other under ordinary-temperature environments (at a temperature of not lower than 5° C. and not higher than 45° C.).

The present inventors have noticed that by using an ink containing metal fine particles dispersed therein with a polymer in which a difference $\Delta SP$ between solubility parameters of a solvent contained in the ink and the polymer is controlled to a predetermined range, and the solubility parameter of the polymer is controlled to a predetermined range, necking between the metal fine particles is caused to proceed rapidly even under ordinary-temperature environments so as to develop high electrical conductivity, and the resulting printed material can be prevented from suffering from deterioration in electrical conductivity even when storing the printed material under high-temperature and high-humidity conditions, and as a result, the present inventors have found that by using such a metal fine particle-containing ink, it is possible to obtain a printed material that can exhibit high electrical conductivity immediately after printing and can maintain the high electrical conductivity even after being stored under high-temperature and high-humidity conditions.

That is, the present invention relates to the following aspects [1] and [2].

[1] A metal fine particle-containing ink containing metal fine particles (a) dispersed therein with a polymer B, in which:
 the ink contains a solvent S;
 a difference $\Delta SP$ ($|SP(S)-SP(B)|$) between solubility parameters of the solvent S and the polymer B is not more than 1.5 $(cal/cm^3)^{0.5}$ wherein SP(S) and SP(B) are a solubility parameter of the solvent S and a solubility parameter of the polymer B, respectively, as measured by a Fedors method; and
 the SP(B) is not less than 9.5 $(cal/cm^3)^{0.5}$ and not more than 10.5 $(cal/cm^3)^{0.5}$.

[2] A method for producing a printed material, including the step of applying the metal fine particle-containing ink according to the above aspect [1] to a printing substrate to form a metal coating film of the ink on the printing substrate under ordinary-temperature environments, thereby obtaining the printed material.

In accordance with the present invention, it is possible to provide a metal fine particle-containing ink that is capable of providing a printed material that has ordinary-temperature sintering properties of metal fine particles therein, can exhibit high electrical conductivity immediately after printing and can maintain the high electrical conductivity even after being stored under high-temperature and high-humidity conditions, and a method for producing a printed material using the metal fine particle-containing ink.

[Metal Fine Particle-Containing Ink]

The metal fine particle-containing ink of the present invention contains metal fine particles (a) dispersed therein with a polymer B, in which the ink contains a solvent S (hereinafter also referred to merely as an "ink solvent S"); a difference $\Delta SP$ $SP(S)-SP(B)|$) between solubility parameters of the ink solvent S and the polymer B is not more than 1.5 $(cal/cm^3)^{0.5}$ wherein SP(S) and SP(B) are a solubility parameter of the solvent S and a solubility parameter of the polymer B, respectively, as measured by a Fedors method; and the SP(B) is not less than 9.5 $(cal/cm^3)^{0.5}$ and not more than 10.5 $(cal/cm^3)^{0.5}$.

The difference $\Delta SP$ ($|SP(S)-SP(B)|$) indicates an absolute value of the difference between SP(S) and SP(B), and is hereinafter referred to merely as "$\Delta SP$".

The term "solubility parameter" as used in the present invention means a value that is calculated from a cohesive energy and a molar volume of a substance on the basis of a molecular structure thereof by a Fedors method (cf. R. F. Fedors, "Polym. Eng. Sci.", 14[2], 147-154 (1974)).

According to the present invention, it is possible to obtain a printed material that has ordinary-temperature sintering properties of metal fine particles therein, can exhibit high electrical conductivity immediately after printing and can maintain the high electrical conductivity even after being stored under high-temperature and high-humidity conditions. The reason why the aforementioned advantageous effects can be attained by the present invention is considered as follows, though it is not clearly determined yet.

That is, in the metal fine particle-containing ink of the present invention, the difference $\Delta SP$ between the solubility parameters of the ink solvent S contained in the ink and the polymer B used for dispersing the metal fine particles is controlled to the predetermined range, and the ink solvent S and the polymer B has high affinity to each other. For this reason, it is presumed that when applying the metal fine particle-containing ink onto a printing substrate, desorption of the polymer B from the metal fine particles and penetration of the polymer B into the substrate are accelerated in association with penetration of the ink solvent S into the substrate, so that the metal fine particles are brought into contact with each other in such a condition that substantially no polymer B is present on the surface of the respective metal fine particles, whereby ordinary-temperature sintering between the metal fine particles are allowed to proceed rapidly. As a result, it is considered that since efficient electrically-conductive paths are formed in the resulting printed material, the volume resistivity of the printed material immediately after printing can be reduced, and further the printed material can be prevented from suffering from increase in volume resistivity under high-temperature and high-humidity conditions.

<Difference $\Delta SP$ Between Solubility Parameters>

When the solubility parameter of the ink solvent S contained in the metal fine particle-containing ink and the solubility parameter of the polymer B used for dispersing the metal fine particles both being measured by a Fedors method are represented by SP(S) and SP(B), respectively, the difference $\Delta SP$ between the solubility parameters SP(S) and SP(B) is not more than 1.5 $(cal/cm^3)^{0.5}$, preferably not more than 1.0 $(cal/cm^3)^{0.5}$, more preferably not more than 0.5 $(cal/cm^3)^{0.5}$, even more preferably not more than 0.1 $(cal/cm^3)^{0.5}$ and further even more preferably not more than 0.07 $(cal/cm^3)^{0.5}$ from the viewpoint of improving electrical conductivity of the resulting printed material immediately after printing and maintaining high electrical conductivity thereof even under high-temperature and high-humidity conditions. The lower limit of the ASP is not particularly limited, and the $\Delta SP$ is preferably not less than 0 $(cal/cm^3)^{0.5}$, and from the viewpoint of facilitating production of the ink, the $\Delta SP$ is more preferably not less than 0.01 $(cal/cm^3)^{0.5}$, even more preferably not less than 0.02 $(cal/cm^3)^{0.5}$ and further even more preferably not less than 0.03 $(cal/cm^3)^{0.5}$.

<Metal Fine Particles (a)>

The metal fine particle-containing ink of the present invention contains the metal fine particles (a) dispersed therein with the polymer B (hereinafter also referred to merely as "metal fine particles (a)").

Examples of the metal (metal atom) constituting the metal fine particles (a) include Group 4 transition metals such as titanium, zirconium, etc.; Group 5 transition metals such as vanadium, niobium, etc.; Group 6 transition metals such as chromium, molybdenum, tungsten, etc.; Group 7 transition metals such as manganese, technetium, rhenium, etc.; Group 8 transition metals such as iron, ruthenium, etc.; Group 9 transition metals such as cobalt, rhodium, iridium, etc.; Group 10 transition metals such as nickel, palladium, platinum, etc.; Group 11 transition metals such as copper, silver, gold, etc.; Group 12 transition metals such as zinc, cadmium, etc.; Group 13 metals such as aluminum, gallium, indium, etc.; Group 14 metals such as germanium, tin, lead, etc.; and the like. As the metal constituting the metal fine particles (a), one kind of metal may be used alone as a single metal, or two or more kinds of metals may be used in combination with each other in the form of an alloy.

Among these metals, preferred are those transition metals belonging to Groups 4 to 11 in the 4th to 6th Periods of the Periodic Table, more preferred are copper as well as noble metals such as gold, silver, platinum, palladium, etc., even more preferred is at least one Group 11 transition metal selected from the group consisting of copper, silver and gold, and further even more preferred is silver.

The kind of metal used herein may be determined by inductively coupled plasma atomic emission spectroscopy.

The average particle size of the metal fine particles (a) contained in the metal fine particle-containing ink is preferably not less than 5 nm, more preferably not less than 10 nm and even more preferably not less than 15 nm, and is also preferably not more than 100 nm, more preferably not more than 80 nm, even more preferably not more than 60 nm and further even more preferably not more than 40 nm, from the viewpoint of improving ordinary-temperature sintering properties of the metal fine particles as well as from the viewpoint of improving electrical conductivity of the resulting printed material immediately after printing and maintaining high electrical conductivity thereof even under high-temperature and high-humidity conditions.

The average particle size may be measured by the method described in Examples below.

The content of the metal in the metal fine particle-containing ink is preferably not less than 1% by mass, more preferably not less than 3% by mass, even more preferably not less than 5% by mass and further even more preferably not less than 7% by mass from the viewpoint of improving electrical conductivity of the resulting printed material immediately after printing and maintaining high electrical conductivity thereof even under high-temperature and high-humidity conditions, and is also preferably not more than 70% by mass, more preferably not more than 65% by mass, even more preferably not more than 60% by mass and further even more preferably not more than 55% by mass from the viewpoint of improving dispersion stability of the metal fine particles.

The content of the metal in the ink may be measured by the method described in Examples below.

<Polymer B>

In the present invention, the polymer B has a function capable of dispersing the metal fine particles (a).

From the viewpoint of improving ordinary-temperature sintering properties of the metal fine particles as well as from the viewpoint of improving electrical conductivity of the resulting printed material immediately after printing and maintaining high electrical conductivity thereof even under high-temperature and high-humidity conditions, the solubility parameter SP(B) of the polymer B as measured by a Fedors method is not less than 9.5 $(cal/cm^3)^{0.5}$, preferably not less than 9.6 $(cal/cm^3)^{0.5}$ and more preferably not less than 9.7 $(cal/cm^3)^{0.5}$, and is also not more than 10.5 $(cal/cm^3)^{0.5}$, preferably not more than 10.3 $(cal/cm^3)^{0.5}$ and more preferably not more than 10.0 $(cal/cm^3)^{0.5}$.

In the case where two or more kinds of polymers having a function capable of dispersing the metal fine particles (a) are used as the polymer B, the SP(B) of the polymer B is a weighted mean value of solubility parameters of the two or more kinds of polymers which are weighted by contents (% by mass) of the respective polymers.

From the viewpoint of improving dispersion stability of the metal fine particles in the ink as well as from the viewpoint of improving electrical conductivity of the resulting printed material immediately after printing and maintaining high electrical conductivity thereof even under high-temperature and high-humidity conditions, the polymer B is preferably a vinyl polymer containing a constitutional unit derived from a polyalkylene glycol segment-containing monomer (b-1).

[Polyalkylene Glycol Segment-Containing Monomer (b-1)]

The monomer (b-1) is preferably a monomer that is capable of introducing a polyalkylene glycol segment into the polymer B as a side chain of the polymer B from the viewpoint of improving dispersion stability of the metal fine particles in the ink as well as from the viewpoint of improving electrical conductivity of the resulting printed material immediately after printing and maintaining high electrical conductivity thereof even under high-temperature and high-humidity conditions. Examples of the monomer (b-1) include polyalkylene glycol monoesters of (meth) acrylate and the like.

These monomers (b-1) may be used alone or in combination of any two or more thereof.

The polyalkylene glycol segment of the monomer (b-1) preferably contains a unit derived from an alkyleneoxide having not less than 2 and not more than 4 carbon atoms. Examples of the alkyleneoxide include ethyleneoxide, propyleneoxide, butyleneoxide and the like.

The number of the units derived from the alkyleneoxide in the aforementioned polyalkylene glycol segment is preferably not less than 2, more preferably not less than 5 and even more preferably not less than 10, and is also preferably not more than 100, more preferably not more than 70 and even more preferably not more than 50.

The aforementioned polyalkylene glycol segment is preferably a copolymer containing a unit derived from ethyleneoxide and a unit derived from propyleneoxide from the viewpoint of improving electrical conductivity of the resulting printed material immediately after printing and maintaining high electrical conductivity thereof even under high-temperature and high-humidity conditions. The molar ratio of the ethyleneoxide unit (EO) to the propyleneoxide unit (PO) [EO/PO] is preferably not less than 60/40, more preferably not less than 65/35 and even more preferably not less than 70/30, and is also preferably not more than 90/10, more preferably not more than 85/15 and even more preferably not more than 80/20.

The copolymer containing the unit derived from ethyleneoxide and the unit derived from propyleneoxide may be in the form of any of a block copolymer, a random copolymer and an alternating copolymer.

Specific examples of commercially available products of the monomer (b-1) include "NK ESTER AM-90G", "NK ESTER AM-130G", "NK ESTER AMP-20GY", "NK ESTER AMP-230G", "NK ESTER M-20G", "NK ESTER M-40G", "NK ESTER M-90G", "NK ESTER M-230G" and the like as products available from Shin-Nakamura Chemical Co., Ltd.; and "BLEMMER PE-90", "BLEMMER PE-200", "BLEMMER PE-350" and the like, "BLEMMER PME-100", "BLEMMER PME-200", "BLEMMER PME-400", "BLEMMER PME-1000", "BLEMMER PME-4000" and the like, "BLEMMER PP-500", "BLEMMER PP-800", "BLEMMER PP-1000" and the like, "BLEMMER AP-150", "BLEMMER AP-400", "BLEMMER AP-550" and the like, and "BLEMMER 50PEP-300", "BLEMMER 50POEP-800B", "BLEMMER 43PAPE-600B" and the like as products available from NOF Corporation.

[Carboxy Group-Containing Monomer (b-2)]

From the viewpoint of improving dispersion stability of the metal fine particles in the ink as well as from the viewpoint of improving electrical conductivity of the resulting printed material immediately after printing and maintaining high electrical conductivity thereof even under high-temperature and high-humidity conditions, the polymer B is preferably a vinyl polymer further containing a constitutional unit derived from a carboxy group-containing monomer (b-2).

Examples of the carboxy group contained in the monomer (b-2) include a carboxy group (—COOM) which is capable of releasing hydrogen ions upon dissociation thereof to allow the monomer to exhibit acidity, or dissociated ion forms of the carboxy group such as —COO$^-$, etc. In the aforementioned chemical formula, M represents a hydrogen atom, an alkali metal, ammonium or an organic ammonium.

Specific examples of the monomer (b-2) include unsaturated monocarboxylic acids such as (meth)acrylic acid, crotonic acid, 2-methacryloyloxymethylsuccinic acid, etc.; unsaturated dicarboxylic acids such as maleic acid, itaconic acid, fumaric acid, citraconic acid, etc.; and the like. Incidentally, the aforementioned unsaturated dicarboxylic acids may be in the form of an anhydride thereof.

These monomers (b-2) may be used alone or in combination of any two or more thereof.

The monomer (b-2) is preferably at least one monomer selected from the group consisting of (meth)acrylic acid and maleic acid, and more preferably (meth)acrylic acid, from the viewpoint of improving dispersion stability of the metal fine particles in the ink as well as from the viewpoint of improving electrical conductivity of the resulting printed material immediately after printing and maintaining high electrical conductivity thereof even under high-temperature and high-humidity conditions.

The term "(meth)acrylic acid" as used in the present specification means at least one compound selected from the group consisting of acrylic acid and methacrylic acid, and the "(meth)acrylic acid" is hereinlater also defined in the same way.

[Hydrophobic Monomer (b-3)]

The polymer B is preferably a vinyl polymer further containing a constitutional unit derived from a hydrophobic monomer (b-3) in addition to the constitutional unit derived from the monomer (b-1) and the constitutional unit derived from the monomer (b-2) from the viewpoint of improving dispersion stability of the metal fine particles in the ink as well as from the viewpoint of improving electrical conductivity of the resulting printed material immediately after printing and maintaining high electrical conductivity thereof even under high-temperature and high-humidity conditions.

The term "hydrophobic" of the monomer (b-3) as used in the present invention means that a solubility in water of the monomer as measured by dissolving the monomer in 100 g of ion-exchanged water at 25° C. until reaching a saturation concentration thereof is less than 10 g. The solubility in water of the monomer (b-3) is preferably not more than 5 g and more preferably not more than 1 g from the viewpoint of improving dispersion stability of the metal fine particles in the ink as well as from the viewpoint of improving electrical conductivity of the resulting printed material immediately after printing and maintaining high electrical conductivity thereof even under high-temperature and high-humidity conditions.

The monomer (b-3) is preferably at least one monomer selected from the group consisting of an aromatic group-containing monomer and a (meth)acrylate containing a hydrocarbon group derived from an aliphatic alcohol having not less than 1 and not more than 22 carbon atoms, and more preferably an aromatic group-containing monomer.

The term "(meth)acrylate" as used in the present specification means at least one compound selected from the group consisting of an acrylate and a methacrylate, and the "(meth)acrylate" is hereinafter also defined in the same way.

These monomers (b-3) may be used alone or in combination of any two or more thereof.

The aromatic group-containing monomer is preferably a vinyl monomer containing an aromatic group having not less than 6 and not more than 22 carbon atoms which monomer may also contain a substituent group containing a hetero atom, and more preferably at least one monomer selected from the group consisting of a styrene-based monomer and an aromatic group-containing (meth)acrylate. The molecular weight of the aromatic group-containing monomer is preferably less than 500.

Examples of the styrene-based monomer include styrene, α-methyl styrene, 2-methyl styrene, vinyl toluene, divinyl benzene and the like. Among these styrene-based monomers, preferred are styrene and α-methyl styrene.

As the aromatic group-containing (meth)acrylate, preferred are phenyl (meth)acrylate, benzyl (meth)acrylate, phenoxyethyl (meth)acrylate, etc., and more preferred is benzyl (meth)acrylate.

As the monomer (b-3), from the viewpoint of improving dispersion stability of the metal fine particles in the ink as well as from the viewpoint of improving electrical conductivity of the resulting printed material immediately after printing and maintaining high electrical conductivity thereof even under high-temperature and high-humidity conditions, even more preferred is the styrene-based monomer, further even more preferred is at least one monomer selected from the group consisting of styrene, α-methyl styrene, 2-methyl styrene and vinyl toluene, and still further even more preferred is at least one monomer selected from the group consisting of styrene and α-methyl styrene.

(Contents of Respective Monomers in Raw Material Monomer or Contents of Respective Constitutional Units in Polymer B)

The contents of the aforementioned monomers (b-1) to (b-3) in the raw material monomer (contents of non-neutralized components; hereinafter defined in the same way) upon production of the polymer B, or the contents of the constitutional units derived from the monomers (b-1) to (b-3) in the polymer B, are as follows, from the viewpoint of improving dispersion stability of the metal fine particles in the ink as well as from the viewpoint of improving electrical conductivity of the resulting printed material immediately after printing and maintaining high electrical conductivity thereof even under high-temperature and high-humidity conditions.

The content of the monomer (b-1) is preferably not less than 1 mol %, more preferably not less than 5 mol % and even more preferably not less than 7 mol %, and is also preferably not more than 30 mol %, more preferably not more than 20 mol % and even more preferably not more than 15 mol %.

The content of the monomer (b-2) is preferably not less than 5 mol %, more preferably not less than 10 mol % and even more preferably not less than 15 mol %, and is also preferably not more than 40 mol %, more preferably not more than 35 mol % and even more preferably not more than 30 mol %.

The content of the monomer (b-3) is preferably not less than 50 mol %, more preferably not less than 60 mol % and even more preferably not less than 65 mol %, and is also preferably not more than 90 mol %, more preferably not more than 85 mol % and even more preferably not more than 80 mol %.

The polymer B is preferably a vinyl polymer that contains a constitutional unit derived from a polyalkylene glycol monoester of (meth)acrylic acid as the monomer (b-1) and a constitutional unit derived from (meth)acrylic acid as the monomer (b-2), and more preferably a vinyl polymer that contains a constitutional unit derived from a polyalkylene glycol monoester of (meth)acrylic acid as the monomer (b-1), a constitutional unit derived from (meth)acrylic acid as the monomer (b-2) and a constitutional unit derived from a styrene-based monomer as the monomer (b-3).

The polymer B may be in the form of any of a block copolymer, a random copolymer and an alternating copolymer. As the polymer B, there may be used either a polymer obtained by copolymerizing the raw material monomer containing the monomer (b-1), the monomer (b-2) and the monomer (b-3) by conventionally known methods, or a commercially available product. Examples of the commercially available product of the polymer B include "DISPERBYK-190" and "DISPERBYK-2015" both available from BYK Chemie GmbH, and the like.

In the case where the aforementioned vinyl polymer is used as the polymer B, the content of the vinyl polymer in the polymer B is preferably not less than 60% by mass, more preferably not less than 70% by mass, even more preferably not less than 80% by mass and further even more preferably not less than 90% by mass, and is also preferably not more than 100% by mass, and furthermore preferably 100% by mass, from the viewpoint of improving dispersion stability of the metal fine particles in the ink, from the viewpoint of improving ordinary-temperature sintering properties of the metal fine particles, as well as from the viewpoint of improving electrical conductivity of the resulting printed material immediately after printing and maintaining high electrical conductivity thereof even under high-temperature and high-humidity conditions.

The number-average molecular weight of the polymer B is preferably not less than 1,000, more preferably not less than 2,000 and even more preferably not less than 3,000, and is also preferably not more than 100,000, more preferably not more than 50,000, even more preferably not more than 30,000, further even more preferably not more than 10,000 and still further even more preferably not more than 7,000. When the number-average molecular weight of the polymer B lies within the aforementioned range, adsorptivity of the polymer B onto the metal fine particles is sufficiently large, so that the metal fine particles can be improved in dispersion stability in the resulting ink. In addition, in such a case, desorption of the polymer B from the metal fine particles is promoted upon forming a metal coating film of the ink on the substrate, so that the resulting printed material is allowed to develop high electrical conductivity.

The number-average molecular weight of the polymer B may be measured by gel permeation chromatography using monodisperse polystyrenes having previously known molecular weights as a reference standard substance.

The acid value of the polymer B is preferably not less than 5 mgKOH/g, more preferably not less than 10 mgKOH/g and even more preferably not less than 15 mgKOH/g, and is also preferably not more than 200 mgKOH/g, more preferably not more than 100 mgKOH/g, even more preferably not more than 50 mgKOH/g and further even more preferably not more than 30 mgKOH/g.

The acid value of the polymer B may be measured by the same method as defined in JIS K 0070 except that only a mixed solvent of ethanol and an ether prescribed as a measuring solvent in JIS K 0070 was replaced with a mixed solvent containing acetone and toluene at a volume ratio [acetone:toluene] of 4:6.

Examples of the configuration of the polymer B in the metal fine particle-containing ink include the configuration in which the polymer B is adsorbed onto the respective metal fine particles (a), the configuration in which the metal fine particles (a) are incorporated in the polymer B, i.e., the metal fine particles (a) are enclosed (encapsulated) in the polymer B, and the configuration in which the polymer B is not adsorbed onto the respective metal fine particles (a). From the viewpoint of improving dispersion stability of the metal fine particles in the ink as well as from the viewpoint of improving electrical conductivity of the resulting printed material immediately after printing and maintaining high electrical conductivity thereof even under high-temperature and high-humidity conditions, among these configurations, preferred is the configuration in which the metal fine particles (a) are incorporated in the polymer B, and more preferred is the metal fine particle-enclosing configuration in which the metal fine particles (a) are enclosed in the polymer B.

The mass ratio of the polymer B to a sum of the polymer B and the metal [polymer B/(polymer B+metal)] in the metal fine particle-containing ink is preferably not less than 0.01, more preferably not less than 0.03 and even more preferably not less than 0.05, and is also preferably not more than 0.3, more preferably not more than 0.2 and even more preferably not more than 0.15, from the viewpoint of improving dispersion stability of the metal fine particles in the ink, from the viewpoint of improving ordinary-temperature sintering properties of the metal fine particles, as well as from the viewpoint of improving electrical conductivity of the resulting printed material immediately after printing and maintaining high electrical conductivity thereof even under high-temperature and high-humidity conditions.

The aforementioned mass ratio [polymer B/(polymer B+metal)] is calculated from masses of the polymer B and the metal which may be measured by the method described in Examples below using a differential thermogravimetric simultaneous measurement apparatus (TG/DTA).

<Ink Solvent S>

The solubility parameter SP(S) of the ink solvent S as measured by a Fedors method is preferably not more than 11.5 $(cal/cm^3)^{0.5}$, more preferably not more than 11.0 $(cal/cm^3)^{0.5}$, even more preferably not more than 10.5 $(cal/cm^3)^{0.5}$ and further even more preferably not more than 10.0 $(cal/cm^3)^{0.5}$, and is also preferably not less than 8.5 $(cal/cm^3)^{0.5}$, more preferably not less than 9.0 $(cal/cm^3)^{0.5}$ and even more preferably not less than 9.5 $(cal/cm^3)^{0.5}$, from the viewpoint of improving electrical conductivity of the resulting printed material immediately after printing and maintaining high electrical conductivity thereof even under high-temperature and high-humidity conditions.

The term "ink solvent" as used in the present invention means an organic solvent or water which is contained in the metal fine particle-containing ink and is present in a liquid state at 25° C. When calculating the SP(S), all of organic solvents and water whose contents in the metal fine particle-containing ink are not less than 1% by mass and which are present in a liquid state at 25° C. should be taken into consideration.

In the case where two or more kinds of ink solvents are contained as the ink solvent S in the metal fine particle-containing ink, the SP(S) of the ink solvent S is a weighted mean value of solubility parameters of the two or more kinds of ink solvents which are weighted by contents (% by mass) of the respective ink solvents.

<Dihydric Alcohol C>

The metal fine particle-containing ink of the present invention preferably contains a dihydric alcohol represented by the following general formula (1) from the viewpoint of improving electrical conductivity of the resulting printed material immediately after printing and maintaining high electrical conductivity thereof even under high-temperature and high-humidity conditions.

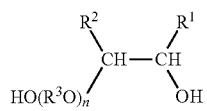

(1)

wherein $R^1$ and $R^2$ are respectively a hydrogen atom or a hydrocarbon group having not less than 1 and not more than 3 carbon atoms; $R^3$ is at least one alkylene group selected from the group consisting of an ethylene group and a propylene group; and n is an integer of not less than 0 and not more than 30, with the proviso that in the general formula (1), in the case where $R^1$ and $R^2$ both are a hydrogen atom, $R^3$ contains at least a propylene group, and n is not less than 1.

In the aforementioned general formula (1), $R^1$ and $R^2$ may be the same or different from each other. It is preferred that one of $R^1$ and $R^2$ is a hydrogen atom, and the other is a hydrocarbon group having not less than 1 and not more than 3 carbon atoms, it is more preferred that one of $R^1$ and $R^2$ is a hydrogen atom, and the other is methyl group, and it is even more preferred that $R^1$ is a methyl group, and $R^2$ is a hydrogen atom.

In the aforementioned general formula (1), $R^3$ is at least one alkylene group selected from the group consisting of an ethylene group and a propylene group, and preferably a propylene group. In the case where $R^1$ and $R^2$ both are a hydrogen atom, $R^3$ contains at least a propylene group. In the case where $R^3$ is a propylene group, $R^3$ is preferably a 1,2-propanediyl group represented by —CH(CH$_3$)CH$_2$— or —CH$_2$CH(CH$_3$)—. In addition, in the case where n is not less than 2, a plurality of $R^3$ groups present in a molecule of the dihydric alcohol may be the same or different from each other.

In the aforementioned general formula (1), n represents an average molar number of addition of an oxyalkylene group represented by $R^3O$, and is preferably 0 or not less than 1. In the case where $R^1$ and $R^2$ both are a hydrogen atom, n is not less than 1. In the case where n is not less than 1, n is preferably not more than 20.

The boiling point of the dihydric alcohol C is preferably not lower than 150° C. and more preferably not lower than 170° C., and is also preferably not higher than 230° C. and more preferably not higher than 210° C. In the case where two or more dihydric alcohols are used in combination with each other as the dihydric alcohol C, the boiling point of the dihydric alcohol C means a weighted mean value of boiling points of the two or more dihydric alcohols which are weighted by contents (% by mass) of the respective dihydric alcohols.

Examples of the dihydric alcohol C include alkanediols such as 1,2-propanediol (propylene glycol), 1,2-butanediol, 2,3-butanediol, 1,2-pentanediol, etc.; and polyalkylene glycols such as polypropylene glycols, etc.

These dihydric alcohols C may be used alone or in combination of any two or more thereof.

Among these dihydric alcohols C, preferred are dihydric alcohols having a 1,2-propanediyl skeleton, more preferred is at least one compound selected from the group consisting of propylene glycol and polypropylene glycols having a polymerization degree of not less than 2 and not more than 20, even more preferred is at least one compound selected from the group consisting of propylene glycol and dipropylene glycol, and further even more preferred is propylene glycol.

Meanwhile, commercially available products of the dipropylene glycol are usually in the form of a mixture containing three kinds of isomers including 4-oxa-2,6-heptanediol, 2-(2-hydroxypropoxy)-propan-1-ol and 2-(2-hydroxy-1-methylethoxy)-propan-1-ol. In the present invention, in the case where the dipropylene glycol is used as the dihydric alcohol C, the dipropylene glycol may be a compound containing at least one of these three isomers.

In addition, in the case where the metal fine particle-containing ink contains propylene glycol as the dihydric alcohol C, and the below-mentioned metal fine particle dispersion used for production of the metal fine particle-containing ink contains propylene glycol as a dispersing medium thereof, the propylene glycol contained in the metal fine particle dispersion may be directly used as the dihydric alcohol C for the metal fine particle-containing ink.

The content of the dihydric alcohol C in the metal fine particle-containing ink is preferably not less than 3% by mass, more preferably not less than 5% by mass and even more preferably not less than 10% by mass, and is also preferably not more than 40% by mass, more preferably not more than 30% by mass, even more preferably not more than 25% by mass and further even more preferably not more than 20% by mass, from the viewpoint of improving electrical conductivity of the resulting printed material immediately after printing and maintaining high electrical conductivity thereof even under high-temperature and high-humidity conditions.

The mass ratio of the dihydric alcohol C to the metal [dihydric alcohol C/metal] in the metal fine particle-containing ink is preferably not less than 0.5, more preferably not less than 0.7 and even more preferably not less than 1, and is also preferably not more than 4, more preferably not more than 3 and even more preferably not more than 2, from the viewpoint of improving dispersion stability of the metal fine particles in the ink.

The content of the dihydric alcohol C and the aforementioned mass ratio [dihydric alcohol C/metal] in the metal fine particle-containing ink may be measured and calculated by the methods described in Examples below.

<Hydroxyketone>

The metal fine particle-containing ink preferably contains a hydroxyketone from the viewpoint of improving dispersion stability of the metal fine particles in the ink.

The hydroxyketone contains a carbonyl group and a hydroxy group in a molecule thereof and is therefore coordinated and adsorbed onto the metal fine particles by these functional groups. In consequence, it is considered that the metal fine particles can be improved in dispersion stability owing to the chelate effect.

As the hydroxyketone, there may be mentioned α-hydroxyketones, β-hydroxyketones and the like. Specific examples of the hydroxyketone include monohydroxyketones such as monohydroxyacetone (1-hydroxy-2-propanone), 1-hydroxy-2-butanone, 3-hydroxy-2-butanone, 3-hydroxy-3-methyl-2-butanone, 1-hydroxy-2-pentanone, 3-hydroxy-2-pentanone, 2-hydroxy-3-pentanone, 4-hydroxy-4-methyl-2-pentanone, 3-hydroxy-2-hexanone, 2-hydroxy-3-hexanone, 4-hydroxy-3-hexanone, 4-hydroxy-3-heptanone, 3-hydroxy-4-heptanone, 5-hydroxy-4-octanone, etc.; and polyhydroxyketones such as dihydroxyacetone. These hydroxyketones may be used alone or in combination of any two or more thereof.

Among these hydroxyketones, from the viewpoint of improving dispersion stability of the metal fine particles in the ink, preferred are α-hydroxyketones, more preferred are α-hydroxyketones having not less than 3 and not more than 8 carbon atoms, even more preferred is at least one hydroxyketone selected from the group consisting of monohydroxyacetone and dihydroxyacetone, and further even more preferred is monohydroxyacetone.

In the case where the metal fine particle-containing ink contains monohydroxyacetone as the hydroxyketone, the monohydroxyacetone exhibits low steric hindrance owing to a low molecular weight thereof. Therefore, it is considered that the monohydroxyacetone can be closely coordinated and adsorbed onto the surface of the respective metal fine particles. Furthermore, the monohydroxyacetone also contains a hydrophobic methyl group and a hydrophilic hydroxymethyl group on opposite sides of the carbonyl group and therefore is excellent in hydrophile-lipophile balance. Thus, it is considered that since the monohydroxyacetone can be adsorbed onto the surface of the respective metal fine particles, it is possible to improve dispersion stability of the metal fine particles. On the other hand, when the metal fine particle-containing ink is applied onto a printing substrate, the monohydroxyacetone tends to be rapidly volatilized even under ordinary-temperature environments owing to a low molecular weight thereof, or tends to be readily desorbed from the surface of the metal fine particles by transfer thereof into the substrate, etc. As a result, it is considered that since the metal fine particles undergo necking therebetween, the resulting printed material not only can promptly exhibit electrical conductivity, but also can be improved in electrical conductivity immediately after printing and can maintain high electrical conductivity even under high-temperature and high-humidity conditions.

The content of the hydroxyketone in the metal fine particle-containing ink is preferably not less than 0.05% by mass, more preferably not less than 0.1% by mass and even more preferably not less than 0.3% by mass, and is also preferably not more than 15% by mass, more preferably not more than 10% by mass, even more preferably not more than 5% by mass, further even more preferably not more than 3% by mass and still further even more preferably not more than 1% by mass, from the viewpoint of improving dispersion stability of the metal fine particles in the ink as well as from the viewpoint of improving electrical conductivity of the resulting printed material immediately after printing and maintaining high electrical conductivity thereof even under high-temperature and high-humidity conditions.

The mass ratio of the hydroxyketone to the metal [hydroxyketone/metal] in the metal fine particle-containing ink is preferably not less than 0.005, more preferably not less than 0.01 and even more preferably not less than 0.03, and is also preferably not more than 5, more preferably not more than 3 and even more preferably not more than 1, from the viewpoint of improving dispersion stability of the metal fine particles in the ink.

The content of the hydroxyketone and the aforementioned mass ratio [hydroxyketone/metal] in in the metal fine particle-containing ink may be measured and calculated by the methods described in Examples below.

<Carboxylic Acid>

The metal fine particle-containing ink preferably contains a mono- or polycarboxylic acid having not less than 1 and not more than 24 carbon atoms, and more preferably a monocarboxylic acid having not less than 1 and not more than 24 carbon atoms (hereinafter also referred to merely as a "monocarboxylic acid"), from the viewpoint of improving electrical conductivity of the resulting printed material immediately after printing and maintaining high electrical conductivity thereof even under high-temperature and high-humidity conditions. The aforementioned carboxylic acid may also contain a functional group other than a carboxy group. Examples of the functional group other than a carboxy group include functional groups that can be coordinated to the metal fine particles, such as a functional group containing a halogen atom, a functional group containing at least one hetero atom, such as a hydroxy group, a thiol group, etc., and the like.

The number of carbon atoms contained in the monocarboxylic acid is preferably not less than 1, and is also preferably not more than 20, more preferably not more than 16, even more preferably not more than 10, further even more preferably not more than 8 and still further even more preferably not more than 6.

The monocarboxylic acid is preferably in the form of a saturated aliphatic monocarboxylic acid from the viewpoint of improving electrical conductivity of the resulting printed material immediately after printing and maintaining high electrical conductivity thereof even under high-temperature and high-humidity conditions.

Examples of the saturated aliphatic monocarboxylic acid include linear aliphatic carboxylic acids such as formic acid, acetic acid, propionic acid, butyric acid, valeric acid, caproic acid, caprylic acid, capric acid, lauric acid, palmitic acid, etc., and the like. Among these saturated aliphatic monocarboxylic acids, preferred is at least one acid selected from the group consisting of formic acid, acetic acid and propionic acid, more preferred is at least one acid selected from the group consisting of acetic acid and formic acid, and even more preferred is acetic acid.

The content of the monocarboxylic acid in the metal fine particle-containing ink is preferably not less than 0.05% by mass, more preferably not less than 0.1% by mass and even more preferably not less than 0.2% by mass, and is also preferably not more than 15% by mass, more preferably not more than 10% by mass, even more preferably not more than 5% by mass, further even more preferably not more than 3% by mass and still further even more preferably not more than 1% by mass, from the viewpoint of improving electrical conductivity of the resulting printed material immediately after printing and maintaining high electrical conductivity thereof even under high-temperature and high-humidity conditions.

The mass ratio of the monocarboxylic acid to the metal [monocarboxylic acid/metal] in the metal fine particle-containing ink is preferably not less than 0.005, more preferably not less than 0.01 and even more preferably not less than 0.02, and is also preferably not more than 1.5, more preferably not more than 1, even more preferably not more than 0.5 and further even more preferably not more than 0.1, from the viewpoint of improving redispersibility of the metal fine particles.

The content of the monocarboxylic acid and the aforementioned mass ratio [monocarboxylic acid/metal] in the metal fine particle-containing ink may be measured and calculated by the methods described in Examples below.

<Organic Solvent D>

The metal fine particle-containing ink preferably contains an organic solvent D from the viewpoint of improving electrical conductivity of the resulting printed material immediately after printing and maintaining high electrical conductivity thereof even under high-temperature and high-humidity conditions. Examples of the organic solvent D include ketones having not less than 3 and not more than 8 carbon atoms other than the hydroxyketones, such as acetone, methyl ethyl ketone, etc.; ethers such as tetrahydrofuran, etc.; acetic acid alkyl ($C_1$ to $C_3$) esters such as ethyl acetate, propyl acetate, etc.; monohydric aliphatic alcohols having not less than 1 and not more than 12 carbon atoms such as ethanol, 2-propanol, terpineol. etc.; and the like.

The solubility parameter SP(D) of the organic solvent D as measured by a Fedors method (hereinafter also referred to merely as "SP(D)") is preferably not more than 11.0 $(cal/cm^3)^{0.5}$, more preferably not more than 10.5 $(cal/cm^3)^{0.5}$, even more preferably not more than 10.0 $(cal/cm^3)^{0.5}$, further even more preferably not more than 9.5 $(cal/cm^3)^{0.5}$ and still further even more preferably not more than 9.0 $(cal/cm^3)^{0.5}$, and is also preferably not less than 7.0 $(cal/cm^3)^{0.5}$, more preferably not less than 7.5 $(cal/cm^3)^{0.5}$ and even more preferably not less than 8.0 $(cal/cm^3)^{0.5}$, from the same viewpoint as described above.

In the case where two or more organic solvents are used as the organic solvent D, the SP(D) of the organic solvent D is a weighted mean value of solubility parameters of the two or more organic solvents which are weighted by contents (% by mass) of the respective organic solvents.

The boiling point of the organic solvent D is preferably not lower than 40° C., more preferably not lower than 50° C. and even more preferably not lower than 60° C., and is also preferably not higher than 230° C., more preferably not higher than 200° C., even more preferably not higher than 150° C., further even more preferably not higher than 100° C., still further even more preferably not higher than 90° C. and furthermore preferably not higher than 80° C. In the case where two or more organic solvents are used as the organic solvent D, the boiling point of the organic solvent D is a weighted mean value of boiling points of the two or more organic solvents which are weighted by contents (% by mass) of the respective organic solvents.

From the same viewpoint as described above, more specifically, as the organic solvent D, preferred is at least one organic solvent selected from the group consisting of acetone, methyl ethyl ketone, tetrahydrofuran and ethyl acetate, more preferred is at least one organic solvent selected from the group consisting of methyl ethyl ketone, tetrahydrofuran and ethyl acetate, and even more preferred is tetrahydrofuran.

The content of the organic solvent D in the metal fine particle-containing ink is preferably not less than 20% by mass, more preferably not less than 30% by mass and even more preferably not less than 40% by mass, and is also preferably not more than 90% by mass, more preferably not more than 85% by mass and even more preferably not more than 80% by mass, from the viewpoint of improving electrical conductivity of the resulting printed material immediately after printing and maintaining high electrical conductivity thereof even under high-temperature and high-humidity conditions.

The mass ratio of the organic solvent D to the metal [organic solvent ID/metal] in the metal fine particle-containing ink is preferably not less than 1, more preferably not less than 3 and even more preferably not less than 5, and is also preferably not more than 10, more preferably not more than 9 and even more preferably not more than 8, from the viewpoint of improving dispersion stability of the metal fine particles in the ink as well as from the viewpoint of improving electrical conductivity of the resulting printed material immediately after printing and maintaining high electrical conductivity thereof even under high-temperature and high-humidity conditions.

The metal fine particle-containing ink may also contain various additives that may be usually used in inks containing metal fine particles, such as a polymer dispersant other than the polymer B, a surfactant, a humectant, a wetting agent, a penetrant, a viscosity modifier, a defoaming agent, an antiseptic agent, a mildew-proof agent, a rust preventive, etc., if required, unless the aforementioned advantageous effects of the present invention are adversely affected by inclusion thereof.

The viscosity of the metal fine particle-containing ink as measured at 32° C. is preferably not less than 0.5 mPa·s, more preferably not less than 1 mPa·s and even more preferably not less than 1.5 mPa·s, and is also preferably not more than 12 mPa·s, more preferably not more than 9 mPa·s and even more preferably not more than 7 mPa·s, from the viewpoint of improving electrical conductivity of the resulting printed material immediately after printing and maintaining high electrical conductivity thereof even under high-temperature and high-humidity conditions. The viscosity of the aforementioned ink may be measured using an E-type viscometer.

(Production of Metal Fine Particle-Containing Ink)

The metal fine particle-containing ink of the present invention may be produced by preliminarily preparing a metal fine particle dispersion, and then mixing the aforementioned dihydric alcohol, hydroxyketone, carboxylic acid and organic solvent D, etc., therewith according to requirements, followed by stirring the resulting mixture.

The metal fine particle dispersion may be obtained by a method (i) of mixing a metal raw material compound A, the polymer B and a reducing agent with each other to subject the metal raw material compound A to reduction reaction, a method (ii) of adding a dispersing medium to metal fine particles preliminarily prepared by conventionally known methods, followed by mixing the resulting mixture, and the like. Among these methods, from the viewpoint of improving dispersion stability of the metal fine particles as well as from the viewpoint of improving electrical conductivity of the resulting printed material immediately after printing and maintaining high electrical conductivity thereof even under high-temperature and high-humidity conditions, preferred is the method (i). By conducting the method (i), the metal raw material compound A is subjected to reduction reaction by the reducing agent so as to form the metal fine particles (a) which are dispersed with the polymer B.

In the method (i), the metal raw material compound A, the polymer B and the reducing agent may be mixed with each other by conventionally known methods, in which the order of mixing of the respective components is not particularly limited.

When mixing the respective components in the method (i), a solvent may be further used therein. In the case of using the solvent, the solvent may also be used as a dispersing medium for the resulting metal fine particle dispersion. As the solvent, there may be mentioned the aforementioned organic solvent D.

The temperature range used upon conducting the reduction reaction is preferably not lower than 10° C., more preferably not lower than 20° C. and even more preferably not lower than 30° C., and is also preferably not higher than 70° C., more preferably not higher than 60° C. and even more preferably not higher than 50° C. The reduction reaction may be conducted either in atmospheric air or in an atmosphere of an inert gas such as nitrogen gas, etc.

[Metal Raw Material Compound A]

The metal raw material compound A is not particularly limited as long as it is a compound containing the aforementioned metal. Examples of the metal raw material compound A include metal salts of inorganic acids or organic acids, metal oxides, metal hydroxides, metal sulfides, metal halides and the like. Specific examples of the aforementioned metal salts include metal salts of inorganic acids, such as nitric acid salts, nitrous acid salts, sulfuric acid salts, carbonic acid salts, ammonium salts, perchloric acid salts, etc.; metal salts of organic acids, such as acetic acid salts, etc.; and the like.

These metal raw material compounds A may be used alone or in the form of a mixture of any two or more thereof.

Among these metal raw material compounds A, preferred is at least one compound selected from the group consisting of metal salts of inorganic acids or organic acids, and metal oxides, more preferred is at least one compound selected from the group consisting of metal salts of nitric acid, and metal oxides, and even more preferred are metal oxides. In the case where the metal raw material compound A is in the form of a metal oxide, no counter ions of the metal ion are contained as impurities in the resulting dispersion, so that it is possible to obtain the metal fine particle dispersion without need of subjecting the dispersion to purification treatment such as dialysis, etc.

As the metal oxides, preferred are oxides of transition metals belonging to Groups 4 to 11 in the 4th to 6th Periods of the Periodic Table, more preferred are oxides of copper, or noble metals such as gold, silver, platinum, palladium, etc., even more preferred is an oxide of at least one metal selected from the group consisting of gold, silver, copper and palladium, further even more preferred is at least one oxide selected from the group consisting of gold oxide, silver oxide and copper oxide, and still further even more preferred is silver oxide.

[Reducing Agent]

The reducing agent used herein is not particularly limited, and may be either an inorganic reducing agent or an organic reducing agent.

Examples of the organic reducing agent include alcohols such as ethylene glycol, propylene glycol, etc.; aldehydes such as formaldehyde, acetaldehyde, propionaldehyde, etc.; acids such as ascorbic acid, citric acid, etc., and salts thereof, aliphatic amines, e.g., alkanolamines such as ethanolamine, N-methyl ethanolamine, N,N-dimethyl ethanolamine (2-(dimethylamino)ethanol), N,N-diethyl ethanolamine, diethanolamine, N-methyl diethanolamine, triethanolamine, propanolamine, N,N-dimethyl propanolamine, butanolamine, hexanolamine, etc., alkyl amines such as propylamine, butylamine, hexylamine, diethylamine, dipropylamine, dimethylethylamine, diethylmethylamine, triethylamine, etc., (poly)alkylene polyamines such as ethylenediamine, triethylenediamine, tetramethyl ethylenediamine, diethylenetriamine, dipropylenetriamine, triethylenetetramine, tetraethylenepentamine, etc., and the like; alicyclic amines such as piperidine, pyrrolidine, N-methyl pyrrolidine, morpholine, etc.; aromatic amines such as aniline, N-methyl aniline, toluidine, anisidine, phenetidine, etc.; aralkyl amines such as benzylamine, N-methyl benzylamine, etc.; and the like.

Examples of the inorganic reducing agent include boron hydride salts such as sodium boron hydride, ammonium boron hydride, etc.; aluminum hydride salts such as lithium aluminum hydride, potassium aluminum hydride, etc.; hydrazines such as hydrazine, hydrazine carbonate, etc.; hydrogen gas; and the like.

Incidentally, these reducing agents may be used alone or in combination of any two or more thereof.

The reducing agent is preferably the organic reducing agent, more preferably at least one compound selected from the group consisting of alcohols and amines, even more preferably at least one compound selected from the group consisting of ethylene glycol, propylene glycol and an alkanol amine having not less than 2 and not more than 6 carbon atoms, and further even more preferably at least one compound selected from the group consisting of propylene glycol and N,N-dimethyl ethanolamine.

In the case where the propylene glycol is used as the reducing agent, the propylene glycol is oxidized upon the reduction reaction to thereby produce monohydroxyacetone. Therefore, by suitably adjusting the conditions of the reduction reaction, it is possible to control contents of the monohydroxyacetone and the propylene glycol in the metal fine particle dispersion. In addition, since the propylene glycol also has a function as a dispersing medium for the metal fine particle dispersion, no step of separately adding an additional dispersing medium to the metal fine particle dispersion is required, which is preferable from the standpoint of facilitated production of the metal fine particle dispersion. Moreover, in the embodiment in which the metal fine particle dispersion further contains the monocarboxylic acid, by adjusting the conditions of the reduction reactions by using the propylene glycol as the reducing agent, the aforementioned monohydroxyacetone is further oxidized upon the reduction reaction to thereby produce acetic acid. Therefore, in such a case, no step of separately adding an additional monocarboxylic acid to the metal fine particle dispersion is required, which is also preferable from the standpoint of facilitated production of the metal fine particle dispersion.

In the present invention, from the viewpoint of removing impurities such as the unreacted reducing agent, a surplus of the polymer B which has no contribution to dispersion of the metal fine particles, etc., the metal fine particle dispersion obtained in the method (i) may be further subjected to purification step.

The method of purifying the metal fine particle dispersion is not particularly limited, and there may be used various methods including membrane treatments such as dialysis, ultrafiltration, etc.; centrifugal separation treatments; and the like. Among these methods, from the viewpoint of efficiently removing the impurities from the resulting dispersion, preferred are the membrane treatments, and more preferred is dialysis. As a material of a dialysis membrane used in the dialysis, there is preferably used a regenerated cellulose.

The molecular weight cutoff of the dialysis membrane is preferably not less than 1,000, more preferably not less than 5,000 and even more preferably not less than 10,000, and is also preferably not more than 100,000 and more preferably not more than 70,000, from the viewpoint of efficiently removing the impurities from the resulting dispersion.

[Method for Producing Printed Material]

The method for producing a printed material according to the present invention is preferably the method including the step of applying the metal fine particle-containing ink to a printing substrate to form a metal coating film of the ink on the printing substrate under ordinary-temperature environments, thereby obtaining the printed material, from the viewpoint of improving electrical conductivity of the resulting printed material immediately after printing and maintaining high electrical conductivity thereof even under high-temperature and high-humidity conditions.

The temperature used upon forming the metal coating film is preferably in an ordinary temperature range from the same viewpoint as described above. More specifically, the temperature used upon forming the metal coating film is preferably not lower than 5° C., more preferably not lower than 10° C., even more preferably not lower than 15° C. and further even more preferably not lower than 20° C., and is also preferably not higher than 45° C., more preferably not higher than 40° C., even more preferably not higher than 35° C. and further even more preferably not higher than 30° C.

<Printing Substrate>

The printing substrate used in the present invention preferably has a porous surface from the viewpoint of improving electrical conductivity of the resulting printed material immediately after printing and maintaining high electrical conductivity thereof even under high-temperature and high-humidity conditions.

The average pore size of the porous surface of the substrate is preferably not less than 10 nm, more preferably not less than 20 nm and even more preferably not less than 30 nm, and is also preferably not more than 200 nm, more preferably not more than 150 nm and even more preferably not more than 100 nm, from the same viewpoint as described above. The average pore size of the porous surface of the substrate may be measured by the method described in Examples below.

As the aforementioned substrate, there may be mentioned porous substrates that are formed of various polymers such as cellulose, polytetrafluoroethylene, oriented polytetrafluoroethylene, polyolefin, polyester, polyamide, polyether, polysulfone, polyethersulfone, polyvinylidene fluoride, polyvinyl chloride, polystyrene, polyethylene, polypropylene, polyacrylonitrile, a (meth)acrylic polymer, polyurethane, etc.; various glass materials; various ceramic materials; or a combination of these materials.

The aforementioned substrate may be used in the form of a coated paper, a glossy paper, a plain paper, a glossy film, etc.

The aforementioned substrate may be of any type as long as it has at least a porous surface. However, from the viewpoint of improving electrical conductivity of the resulting printed material immediately after printing and maintaining high electrical conductivity thereof even under high-temperature and high-humidity conditions, it is preferred that the aforementioned substrate is such a substrate on the surface of which a fine particle-containing layer as a porous layer of a void type is formed (hereinafter also referred to merely as a "void-type substrate").

The void-type substrate is preferably produced by forming the fine particle-containing layer constituted of fine particles and a water-soluble polymer (binder) on a surface of a support body. By forming such a fine particle-containing layer, the ink solvent S and the polymer B are absorbed into voids between the fine particles by a capillary force owing to the voids, so that the resulting printed material is allowed to develop high electrical conductivity from immediately after printing and maintain the high electrical conductivity even under high-temperature and high-humidity conditions.

Examples of the aforementioned fine particles include inorganic fine particles and organic fine particles. Among these fine particles, preferred are at least one kind of inorganic fine particles selected from the group consisting of silica and alumina, and more preferred are at least one kind of porous inorganic fine particles selected from the group consisting of silica and alumina.

As the aforementioned water-soluble polymer (binder), there may be mentioned polyvinyl alcohol and the like.

As the support body of the void-type substrate, preferred are those including a paper, a resin film and a composite thereof, etc., and from the viewpoint of improving versatility of the substrate, more preferred is a paper. That is, the printing substrate used in the present invention is preferably a substrate including a paper support body and an inorganic fine particle-containing layer formed on the surface of the paper support body from the viewpoint of improving electrical conductivity of the resulting printed material immediately after printing and maintaining high electrical conductivity thereof even under high-temperature and high-humidity conditions.

The method of applying the metal fine particle-containing ink is not particularly limited. Examples of the method of applying the metal fine particle-containing ink include ink-jet printing, screen printing, flexographic printing, gravure printing, offset printing, dispenser printing, slot die coating, clip coating, spray coating, spin coating, doctor blading, knife edge coating, bar coating, and the like. Among these methods, from the viewpoint of improving electrical conductivity of the resulting printed material immediately after printing and maintaining high electrical conductivity thereof even under high-temperature and high-humidity conditions, preferred is an ink-jet printing method.

In the case where the method of applying the metal fine particle-containing ink is the ink-jet printing method, the metal fine particle-containing ink may be loaded to an ink-jet printing apparatus from which droplets of the ink are ejected onto the substrate to form the metal coating film on the substrate. The ink-jet printing apparatus may be of either a thermal type or a piezoelectric type. Among these apparatuses, preferred is an ink-jet printing apparatus of a piezoelectric type.

The temperature of the ink-jet print head is not particularly limited as long as the temperature falls with the range in which the aforementioned metal coating film can be formed on the substrate. From the viewpoint of improving electrical conductivity of the resulting printed material immediately after printing and maintaining high electrical conductivity thereof even under high-temperature and high-humidity conditions, the temperature of the ink-jet print head is preferably not lower than 15° C., more preferably not lower than 20° C. and even more preferably not lower than 25° C., and is also preferably not higher than 45° C., more preferably not higher than 40° C. and even more preferably not higher than 35° C.

The head voltage applied to the ink-jet print head is preferably not less than 5 V, more preferably not less than 10 V and even more preferably not less than 15 V, and is also preferably not more than 40 V, more preferably not more than 35 V and even more preferably not more than 30 V, from the viewpoint of improving printing efficiency, etc.

The drive frequency of the print head is preferably not less than 1 kHz, more preferably not less than 5 kHz and even more preferably not less than 10 kHz, and is also preferably not more than 50 kHz, more preferably not more than 40 kHz and even more preferably not more than 35 kHz, from the viewpoint of improving printing efficiency, etc.

The amount of droplets of the metal fine particle-containing ink ejected is preferably not less than 5 pL and more preferably not less than 10 pL, and is also preferably not more than 30 pL and more preferably not more than 20 pL, as calculated per one ink droplet ejected, from the viewpoint of maintaining accuracy of impact positions of the ink droplets as well as from the viewpoint of improving electrical conductivity of the resulting printed material immediately after printing and maintaining high electrical conductivity thereof even under high-temperature and high-humidity conditions.

The amount of the metal fine particle-containing ink applied onto the printing substrate in terms of a solid content thereof is preferably not less than 0.5 g/m$^2$, more preferably not less than 1 g/m$^2$ and even more preferably not less than 2 g/m$^2$, and is also preferably not more than 20 g/m$^2$, more preferably not more than 15 g/m$^2$ and even more preferably not more than 10 g/m$^2$.

The resolution is preferably not less than 200 dpi and more preferably not less than 300 dpi, and is also preferably not more than 1,000 dpi, more preferably not more than 800 dpi and even more preferably not more than 600 dpi. Meanwhile, the term "resolution" as used in the present specification means the number of dots per 1 inch (2.54 cm) which are formed on the substrate. For example, the "resolution of 600 dpi" means that when the ink droplets are ejected onto the printing substrate using a line print head on which a nozzle row is arranged such that the number of nozzle ports per a length of the nozzle row corresponds to 600 dpi (dots/inch), a corresponding dot row of 600 dpi is formed in the direction perpendicular to a transporting direction of the printing substrate, and further when ejecting the ink droplets while moving the printing substrate in the transporting direction thereof, the dot row of 600 dpi is also formed on the printing substrate along the transporting direction thereof. In the present specification, it is assumed that the value of the resolution in the direction perpendicular to the transporting direction of the printing substrate is the same as the value of the resolution in the transporting direction of the printing substrate.

From the viewpoint of improving electrical conductivity of the resulting printed material immediately after printing and maintaining high electrical conductivity thereof even under high-temperature and high-humidity conditions, the production method of the present invention may further include, after applying the metal fine particle-containing ink to the printing substrate under ordinary-temperature environments, the drying step of drying the coating film of the ink on the printing substrate at a temperature equal to the ink-applying temperature or a temperature that falls within an ordinary temperature range but is higher than the ink-applying temperature. However, from the viewpoint of enhancing productivity of the printed material, it is preferred that the production method of the present invention includes no drying step.

(Printed Material)

The film thickness of the metal coating film formed on the printed material is preferably not less than 0.1 μm, more preferably not less than 0.2 μm and even more preferably not less than 0.5 μm, and is also preferably not more than 5 μm, more preferably not more than 4 μm and even more preferably not more than 3 μm.

The volume resistivity ρv (I) of the metal coating film immediately after printing is preferably not more than $5 \times 10^{-5}$ Ω·cm, more preferably not more than $3 \times 10^{-5}$ Ω·cm, even more preferably not more than $1 \times 10^{-5}$ Ω·cm, further even more preferably not more than $9 \times 10^{-6}$ Ω·cm and still further even more preferably not more than $8 \times 10^{-6}$ Ω·cm. From the viewpoint of facilitating production of the printed material, the volume resistivity ρv (I) of the metal coating film immediately after printing is also preferably not less than $2 \times 10^{-6}$ Ω·cm, more preferably not less than $4 \times 10^{-6}$ Ω·cm, and even more preferably not less than $6 \times 10^{-6}$ Ω·cm.

In the present invention, even when storing the printed material under high-temperature and high-humidity conditions, the printed material can be prevented from suffering from increase in volume resistivity thereof. Therefore, the preferred range of the volume resistivity ρv (II) of the metal coating film after storing the printed material under environmental conditions of a temperature of 80° C. and a relative humidity of 80% RH for 30 days is preferably identical to the preferred range of the aforementioned volume resistivity ρv (I). More specifically, the volume resistivity ρv (II) of the metal coating film on the printed material is preferably not more than $5 \times 10^{-5}$ Ω·cm, more preferably not more than $3 \times 10^{-5}$ Ω·cm, even more preferably not more than $1 \times 10^{-5}$ Ω·cm, further even more preferably not more than $9 \times 10^{-6}$ Ω·cm and still further even more preferably not more than $8 \times 10^{-6}$ Ω·cm. From the viewpoint of facilitating production of the printed material, the volume resistivity ρv (II) of the metal coating film on the printed material is preferably not less than $2 \times 10^{-6}$ Ω·cm, more preferably not less than $4 \times 10^{-6}$ Ω·cm, and even more preferably not less than $6 \times 10^{-6}$ Ω·cm.

The aforementioned volume resistivity ρv (I) and volume resistivity ρv (II) may be measured by the methods described in Examples below.

The metal fine particle-containing ink and the method of producing a printed material using the metal fine particle-containing ink according to the present invention are capable of attaining ordinary-temperature sintering properties of the metal fine particles as well as excellent electrical conductivity of the resulting printed material, and are therefore useful for production of wirings, electrodes or the like used in various application fields. Examples of the applications of the metal fine particle-containing ink and the production method according to the present invention include RFID (radio frequency identifier) tags; capacitors such as MLCC (multi-layer ceramic capacitor), etc.; electronic papers; image display devices such as liquid crystal displays, organic EL displays, etc.; organic EL elements; organic transistors; wiring boards such as printed wiring boards, flexible wiring boards, etc.; organic solar cells; sensors such as flexible sensors, etc.; bonding agents such as solders, etc.; and the like.

EXAMPLES

In the following Preparation Examples, Production Examples, Examples and Comparative Examples, the "part(s)" and "%" indicate "part(s) by mass" and "% by mass", respectively, unless otherwise specified.

(1) Measurement of Content of Metal and Content of Polymer B in Metal Fine Particle-Containing Ink or Metal Fine Particle Dispersion Using a simultaneous thermogravimetry/differential thermal analysis (TG/DTA) measurement apparatus "STA7200RV" (tradename) available from Hitachi High-Tech Science Corporation, 10 mg of the metal fine particle-containing ink or the metal fine particle dispersion as a sample to be measured was weighed in an aluminum pan cell, and heated from 35° C. to 550° C. at a temperature rise rate of 10° C./min to measure a reduced mass of the sample under an air flow of 50 mL/min.

The reduced mass of the sample as measured in a temperature range of from 35° C. to 230° C. was defined as a mass of the ink solvent S, the reduced mass of the sample as measured in a temperature range of from 230° C. to 550° C. was defined as a mass of the polymer B, and a mass of the residue at 550° C. was defined as a mass of the metal, to calculate a content (%) of the metal and a content (%) of the polymer B in the metal fine particle-containing ink or the metal fine particle dispersion.

(2-1) Qualitative Analysis of Respective Components in Metal Fine Particle-Containing Ink or Metal Fine Particle Dispersion The qualitative analysis of the respective components in the metal fine particle-containing ink or the metal fine particle dispersion was carried out using a gas chromatograph (GC). The measuring conditions used in the analysis were as follows.

GC: "Agilent Technology 6890N Network GC" available from Agilent Technologies, Inc.

Hydrogen generator: "HG26S" available from GL Sciences Inc.

GC temperature conditions: After maintaining a sample to be measured at 40° C. for 5 minutes, the sample was heated from 40° C. to 240° C. at a temperature rise rate of 10° C./min, and maintained at 240° C. for 5 minutes.

Sample to be measured: Using a material prepared by mixing 0.1 g of the metal fine particle-containing ink or the metal fine particle dispersion with 9.9 g of acetone, stirring the resulting mixture at 25° C. for 10 hours with a magnetic stirrer, and then subjecting the mixture to filtration treatment through a syringe filter "DISMIC-13HP" (PTFE; 0.2 μm) available from Advantec Co., Ltd.

Detection times for standard samples: 10.03 min for monohydroxyacetone; 11.47 min for acetic acid; 2.48 min for acetone.

(2-2) Measurement of Contents of Respective Components in Metal Fine Particle-Containing Ink or Metal Fine Particle Dispersion The contents of respective components including monohydroxyacetne, propylene glycol, a low-molecular weight carboxylic acid, etc., in the metal fine particle-containing ink or the metal fine particle dispersion were quantitatively determined by the following method using $^1$H-NMR.

(Measuring Conditions)

Measuring device: "FT-NMR Mercury-400" available from Varian, Inc.

Nucleus measured: $^1$H

Sample to be measured: Using a mixture prepared by mixing 0.2 g of the metal fine particle dispersion with 1.0 g of the below-mentioned heavy water containing an internal standard.

Magnetic field strength: 14.09637 [T]

Frequency of scanning: 16 times

Measuring temperature: 30° C.

Relaxation time: 45 sec (Preparation of Heavy Water Containing Internal Standard)

TSP (sodium 3-(trimethylsilyl)propionate-2,2,3,3-d4) was weighed in an amount of 0.1 g in a 100 mL measuring flask, and then heavy water was added to the measuring flask until the contents of the measuring flask reached 100 mL. The contents of the measuring flask were allowed to stand overnight to completely dissolve solid components therein, thereby preparing heavy water containing TSP as an internal standard.

(Quantitative Determination of Contents of Respective Components in Metal Fine Particle-Containing Ink or Metal Fine Particle Dispersion)

The contents of the respective components in the metal fine particle-containing ink or the metal fine particle dispersion were quantitatively determined from integrated values of proton signals of the respective components on the basis of the obtained $^1$H-NMR spectrum. The quantitative determination was carried out using the integrated value of 6 ppm (for methylene protons of monohydroxyacetone), the integrated value of δ 1.1 ppm (for methyl protons of propylene glycol), and the integrated value of δ 1.8 ppm (for acetyl protons of acetic acid) assuming that TSP was δ 0 ppm.

(3) Measurement of Average Particle Size of Metal Fine Particles (a)

The metal fine particle-containing ink or the metal fine particle dispersion was diluted with ion-exchanged water so as to control a content of the metal therein to 0.1% by mass. The resulting dilute solution was applied to a hydrophilized carbon support film "ELASTIC CARBON ELS-C10 STEM Cu 100P grid specification" (tradename) available from Okenshoji Co., Ltd., and naturally dried in air. The thus air-dried film was observed by a field emission-type scanning electron microscope (FE-SEM) "S-4800" available from Hitachi Limited under the conditions of STEM mode and an accelerated voltage of 30 KV to obtain a transmission image thereof. The thus microphotographed STEM image was treated by an image analyzing software "A-Zo-Kun" available from Asahi Kasei Engineering Corporation to calculate an "equivalent circle diameter" of each of 200 particles therein which was defined as a particle size of the respective particles.

The numeral values of an upper 5% and a lower 5% of the thus calculated particle sizes of the 200 particles were removed therefrom to determine an average value of particle sizes of the remaining 90% thereof. The thus determined average value was defined as an average particle size of the metal fine particles (a).

(4) Measurement of Average Pore Size of Porous Surface of Printing Substrate

The surface of the printing substrate was observed by a field emission-type scanning electron microscope (FE-SEM) "S-4800" available from Hitachi Limited under the conditions of SEM mode and an accelerated voltage of 10 KV to thereby microphotograph a surface SEM image thereof. The thus obtained SEM image was analyzed by an image analyzing software "Image J" available from The National Institutes of Health to treat a region of 1 μm$^2$ of the image and thereby calculate an "equivalent circle diameter" of respective pores present thereon which was defined as a pore size of the respective pores. The numeral values of an upper 5% and a lower 5% of the thus calculated pore sizes were removed therefrom to determine an average value of pore sizes of the remaining 90% thereof. The thus determined average value was defined as an average pore size of the porous surface of the printing substrate.

<Preparation of Metal Fine Particle Dispersion>

Preparation Example 1

A 10 L glass spinner flask with side arms (PYREX) was charged with 200 g of an aqueous solution (having a solid content of 40%) of a styrene/α-methyl styrene/acrylic acid/maleic acid/alkoxy (polyethylene glycol/polypropylene glycol) acrylate (number of alkyleneoxide units: 32 mol; molar ratio [EP/PO]=75/25) copolymer "DISPERBYK-2015" (tradename) available from BYK Chemie GmbH (hereinafter also referred to merely as "BYK-2015") as the polymer B and 1,200 g of propylene glycol as the reducing agent, and the contents of the flask were stirred with a magnetic stirrer at an ordinary temperature (25° C.; in the following Examples, etc., the ordinary temperature indicates 25° C.)

for 0.5 hour. Thereafter, while stirring the contents of the flask with the magnetic stirrer, 1,000 g of silver oxide (guaranteed reagent) available from FUJIFILM Wako Pure Chemical Corporation as the metal raw material compound A was charged into the flask, followed by further stirring the contents of the flask at an ordinary temperature for 1 hour. Then, the flask was dipped in a water bath at 30° C. After the inside temperature of the flask reached 30° C., the contents of the flask were stirred for 2 hours, and then air-cooled, thereby obtaining a dark brown liquid.

The thus obtained dark brown liquid was charged into a 100 mL-capacity angle rotor, and subjected to centrifugal separation using a high-speed cooling centrifuge "himaCR22G" (tradename; temperature set: 20° C.) available from Koki Holdings Co., Ltd., at 3,000 rpm for 20 minutes. Thereafter, the liquid layer portion thus separated from the liquid was subjected to filtration treatment using a 25 mL-capacity needleless syringe available from Terumo Corporation fitted with a 5 μm-pore size membrane filter "Minisart" (tradename) available from Sartorius Inc., thereby obtaining a silver fine particle dispersion 1 (hereinafter also referred to merely as a "dispersion 1"). The yield of the metal (silver) fine particles a as measured by the following method was 95%.

The composition of the dispersion 1 was measured and calculated by the methods described in the aforementioned items (1), (2-1) and (2-2). As a result, it was confirmed that the content of silver in the dispersion 1 was 37.4%, the content of the polymer B therein was 3.6%, the content of the propylene glycol therein was 55.7%, the content of monohydroxyacetone therein was 2.1%, and the content of acetic acid therein was 1.2%, and the average particle size of the silver fine particles a1 as measured by the method described in the aforementioned item (3) was 29 nm.

[Measurement of Yield of Metal Fine Particles (a)]

A 1 L polyethylene beaker was charged with 10 g of the resulting metal fine particle dispersion and 500 g of ion-exchanged water, and the contents of the beaker were stirred with a magnetic stirrer at an ordinary temperature for 10 minutes. Thereafter, the resulting dispersion was allowed to stand at an ordinary temperature for 2 hours, and then subjected to decantation to remove a supernatant solution therefrom. Next, 500 g of ion-exchanged water was charged into the beaker, and the contents of the beaker were stirred with a magnetic stirrer at an ordinary temperature for 10 minutes. Thereafter, the resulting dispersion was allowed to stand at an ordinary temperature for 2 hours, and then subjected again to decantation to remove a supernatant solution therefrom. Then, the resulting precipitate was dried at 100° C. under reduced pressure at 8 kPa for 24 hours using the vacuum dryer "DP-33", thereby obtaining a dry precipitated component. The yield of the metal fine particles (a) (ratio of the metal fine particles (a) remaining unprecipitated under the aforementioned conditions) was calculated according to the following formula.

Yield (%) of metal fine particles($a$)=100×[1−(mass (g) of dry precipitated component/mass (g) of metal contained in 10 g of resulting metal fine particle dispersion)]

<Metal Fine Particle-Containing Ink>

Example 1

(1) Preparation of Ink 1

A 100 mL polyethylene screw vial was charged with 20 g of the dispersion 1 (silver content: 37.4%) obtained in Preparation Example 1. Next, 54.8 g of ethyl acetate was charged into the screw vial, and the contents of the screw vial were stirred with a magnetic stirrer at an ordinary temperature for 0.5 hour, thereby obtaining an ink 1 having a composition shown in Table 1.

(2) Production of Printed Material by Ink-Jet Printing Method

Under the environmental conditions of a temperature of 25±1° C. and a relative humidity of 30±5% RH, the ink 1 was loaded into an ink-jet print evaluation apparatus available from Trytech Co., Ltd., equipped with an ink-jet print head "KJ4B-QA06NTB-STDV" (piezoelectric type; number of nozzles: 2,656) available from Kyocera Corporation.

The printing conditions were set to a head applied voltage of 26 V, a head drive frequency of 20 kHz, an ejected ink droplet amount of 18 pL, a head temperature of 32° C., a resolution of 600 dpi, the number of ink shots for flushing before being ejected of 200 shots and a negative pressure of −4.0 kPa, and a printing substrate was fixed on a transportation table under reduced pressure such that a longitudinal direction of the printing substrate was aligned with a transportation direction thereof. Under the same temperature and humidity environmental conditions as described above, a printing command was transmitted to the aforementioned print evaluation apparatus to conduct printing by a single pass mode at Duty 100%, thereby obtaining a printed material 1.

As the printing substrate, there was used a commercially available photographic glossy paper for ink-jet printing "Photographic Paper <Glossy>, Model No.: KA4100PSKR" (tradename) available from Seiko Epson Corporation.

Examples 2 to 5 and Comparative Examples 1 and 2

The same procedure as in Example 1(1) was repeated except that ethyl acetate as the organic solvent D for diluting the dispersion 1 was replaced with those shown in Table 1, thereby obtaining respective inks.

Thereafter, the same procedure as in Example 1(2) was repeated except for using the thus obtained respective inks instead, thereby obtaining respective printed materials.

Example 6

The dispersion 1 obtained in Preparation Example 1 was charged into a dialysis tube "Spectra/Por 6" (tradename; dialysis membrane: regenerated cellulose; molecular weight cutoff (MWCO)=50 K) available from Spectrum Laboratories Inc., and the dialysis tube was hermetically sealed with closers at opposite upper and lower ends thereof. The thus closed dialysis tube was dipped in 5 L of tetrahydrofuran filled in a 5 L glass beaker, and then the dispersion was stirred for 1 hour while maintaining a temperature of the dispersion in the range of 20 to 25° C. Thereafter, the whole amount of the tetrahydrofuran was replaced with new one every one hour, and after the replacement procedure was repeated three times, the resulting dispersion was stirred for 24 hours to complete the dialysis treatment and thereby remove propylene glycol therefrom. After that, the thus obtained dispersion was concentrated at 60° C. under reduced pressure at 8 kPa to control a solid content of the dispersion to 40%, and then acetic acid, tetrahydrofuran, monohydroxy acetone and ethanol were added to the concentrated dispersion so as to attain a composition of ink shown in Table 2, followed by mixing the resulting mixture at room temperature, thereby obtaining an ink 6.

Thereafter, the same procedure as in Example 1(2) was repeated except for using the thus obtained ink 6 instead, thereby obtaining a printed material 6.

Examples 7 to 12

The dispersion 1 obtained in Preparation Example 1 was concentrated at 60° C. under reduced pressure at 8 kPa to remove monohydroxyacetone and acetic acid from the dispersion 1. Thereafter, the respective components were added and mixed with each other in the same manner as in Example 6 so as to attain a composition of ink shown in Table 2, thereby obtaining respective inks.

Thereafter, the same procedure as in Example 1(2) was repeated except for using the thus obtained respective inks instead, thereby obtaining respective printed materials.

Using the printed materials obtained in the aforementioned Examples and Comparative Examples, the ordinary-temperature sintering properties of the metal fine particles as well as the electrical conductivity of the metal coating film on the basis of a volume resistivity thereof as measured immediately after printing and after storing the respective printed materials under high-temperature and high-humidity conditions, were evaluated by the following methods. The results are shown in Tables 1 and 2.

<Evaluation of Ordinary-Temperature Sintering Properties>

The respective printed materials obtained in the aforementioned Examples and Comparative Examples were cut vertically from its surface opposed to the surface on which the metal coating film was formed, using a stainless steel razor (76 razor for ordinary use; blade thickness: 76 μm) available from FEATHER Safety Razor Co., Ltd.

Then, the thus cut printed material was attached to an SEM stage "Type-T" available from Nisshin EM Co., Ltd., using a carbon double-sided adhesive tape for SEM (aluminum substrate; catalogue No. 732) available from Nisshin EM Co., Ltd., and the cut section of the printed material was observed using a field emission-type scanning electron microscope (FE-SEM) "Model: S-4800" available from Hitachi Limited under the conditions of SEM mode and an accelerated voltage of 10 KV to thereby obtain a secondary electron image thereof. The thus obtained secondary electron image was examined to ascertain whether or not the silver fine particles underwent necking therebetween and were sintered to each other at an ordinary temperature.

<Measurement of Volume Resistivity $\rho v$ (I) Immediately after Printing>

The respective printed materials obtained in the aforementioned Examples and Comparative Examples were cut into a size of 1 cm×2 cm by the aforementioned razor. Then, the resistivity of the thus obtained cut sample was measured by a resistivity meter (body: "Loresta-GP"; four-point probe; PSP probe, both available from Mitsubishi Chemical Analytech Co., Ltd.), upon which the thickness (t) of the metal coating film on the respective printed materials as separately measured by the following method was input to the aforementioned resistivity meter, to display a volume resistivity thereof. The same measurement as described above was conducted at the other positions of the sample to determine a volume resistivity $\rho v$ (I) of the sample as an arithmetic mean of the 10 measured resistivity values in total.

[Measurement of Thickness of Metal Coating Film]

The respective printed materials obtained in the aforementioned Examples and Comparative Examples were stored under the environmental conditions of a temperature of 25° C. and a relative humidity of 50% RH for 1 hour after being subjected to the printing. The thus stored respective printed materials were observed by the same method as described above using a field emission-type scanning electron microscope, thereby obtaining a secondary electron image thereof. The film thickness of the metal coating film in the thus obtained secondary electron image was measured at 10 positions thereon to determine a thickness (t) of the metal coating film as an arithmetic mean of the 10 measured thickness values.

<Volume Resistivity $\rho v$ (II) after being Stored for 30 Days Under High-Temperature and High-Humidity Conditions>

The respective printed materials obtained in the aforementioned Examples and Comparative Examples were stored under the environmental conditions of a temperature of 25° C. and a relative humidity of 50% RH for 1 hour after being subjected to the printing. Then, the respective printed materials were further stored under the high-temperature and high-humidity conditions of a temperature of 80° C. and a relative humidity of 80% RH for 30 days. Thereafter, the volume resistivity $\rho v$ (II) of the thus stored respective printed materials was measured by the same method as used above for the measurement of the volume resistivity $\rho v$ (I) to calculate a rate of change in volume resistivity of the respective printed materials according to the following formula.

Incidentally, as the thickness (t) of the metal coating film to be inputted into the resistivity meter upon measuring the volume resistivity $\rho v$ (II), there was used the same thickness value as measured upon the measurement of the volume resistivity $\rho v$ (I) immediately after printing.

Rate (%) of change in volume resistivity between before and after being stored=100×[$\rho v(II)$−$\rho v(I)$]/$\rho v(I)$

TABLE 1-1

| | | | Example 1 | Example 2 | Example 3 | Example 4 | Example 5 | Comparative Example 1 | Comparative Example 2 |
|---|---|---|---|---|---|---|---|---|---|
| Kind of metal fine particle-containing ink | | | Ink 1 | Ink 2 | Ink 3 | Ink 4 | Ink 5 | Ink C1 | Ink C2 |
| Kind of metal fine particle dispersion | | | dispersion 1 | dispersion 1 | dispersion 1 | dispersion 1 | dispersion 1 | dispersion 1 | dispersion 1 |
| Composition of ink (% by mass) | | Metal (silver) | 10.0 | 10.0 | 10.0 | 10.0 | 10.0 | 10.0 | 10.0 |
| | | Polymer B | 1.0 | 1.0 | 1.0 | 1.0 | 1.0 | 1.0 | 1.0 |
| | Dihydric alcohol C | Propylene glycol | 14.9 | 14.9 | 14.9 | 14.9 | 14.9 | 14.9 | 14.9 |
| | Hydroxyketone | Monohydroxy acetone | 0.6 | 0.6 | 0.6 | 0.6 | 0.6 | 0.6 | 0.6 |
| | Monocarboxylic acid | Acetic acid | 0.3 | 0.3 | 0.3 | 0.3 | 0.3 | 0.3 | 0.3 |

TABLE 1-1-continued

|  |  | Example 1 | Example 2 | Example 3 | Example 4 | Example 5 | Comparative Example 1 | Comparative Example 2 |
|---|---|---|---|---|---|---|---|---|
| Organic solvent D | Ethyl acetate | 73.3 | | | | | | |
|  | Tetrahydrofuran | | 73.3 | | | | | |
|  | Methyl ethyl ketone | | | 73.3 | | | | |
|  | Acetone | | | | 73.3 | | | |
|  | Terpineol | | | | | 73.3 | | |
|  | Isopropanol | | | | | | 73.3 | |
|  | Ethanol | | | | | | | 73.3 |
|  | Total | 100.0 | 100.0 | 100.0 | 100.0 | 100.0 | 100.0 | 100.0 |
| Average particle size (nm) of metal fine particles (a) in ink | | 30 | 30 | 30 | 30 | 30 | 30 | 30 |

TABLE 1-2

|  |  | Example 1 | Example 2 | Example 3 | Example 4 |
|---|---|---|---|---|---|
|  | SP(B) ((cal/cm$^3$)$^{0.5}$) | 9.86 | 9.86 | 9.86 | 9.86 |
|  | SP(S) ((cal/cm$^3$)$^{0.5}$) | 9.69 | 9.82 | 9.88 | 9.92 |
|  | ΔSP \|(SP(S) − SP(B))\| ((cal/cm$^3$)$^{0.5}$) | 0.17 | 0.04 | 0.02 | 0.06 |
|  | Kind of printing substrate | KA4100PSKR | KA4100PSKR | KA4100PSKR | KA4100PSKR |
|  | Kind of printed material | Printed material 1 | Printed material 2 | Printed material 3 | Printed material 4 |
| Evaluation | Ordinary-temperature sintering properties | Yes | Yes | Yes | Yes |
|  | Volume resistivity ρv (I) (Ω · cm) immediately after printing | 8.00 × 10$^{-6}$ | 7.60 × 10$^{-6}$ | 7.80 × 10$^{-6}$ | 8.30 × 10$^{-6}$ |
|  | Volume resistivity ρv (II) (Ω · cm) after being stored under high-temperature and high-humidity conditions | 8.10 × 10$^{-6}$ | 7.65 × 10$^{-6}$ | 7.90 × 10$^{-6}$ | 8.50 × 10$^{-6}$ |
|  | Rate (%) of change in volume resistivity between before and after being stored | 1.3 | 0.7 | 1.3 | 2.4 |

|  |  | Example 5 | Comparative Example 1 | Comparative Example 2 |
|---|---|---|---|---|
|  | SP(B) ((cal/cm$^3$)$^{0.5}$) | 9.86 | 9.86 | 9.86 |
|  | SP(S) ((cal/cm$^3$)$^{0.5}$) | 11.24 | 12.20 | 12.70 |
|  | ΔSP \|(SP(S) − SP(B))\| ((cal/cm$^3$)$^{0.5}$) | 1.38 | 2.34 | 2.84 |
|  | Kind of printing substrate | KA4100PSKR | KA4100PSKR | KA4100PSKR |
|  | Kind of printed material | Printed material 5 | Printed material C1 | Printed material C2 |
| Evaluation | Ordinary-temperature sintering properties | Yes | Yes | Yes |
|  | Volume resistivity ρv (I) (Ω · cm) immediately after printing | 9.10 × 10$^{-6}$ | 9.30 × 10$^{-6}$ | 1.10 × 10$^{-5}$ |
|  | Volume resistivity ρv (II) (Ω · cm) after being stored under high-temperature and high-humidity conditions | 9.60 × 10$^{-6}$ | 9.90 × 10$^{-6}$ | 1.20 × 10$^{-5}$ |
|  | Rate (%) of change in volume resistivity between before and after being stored | 5.5 | 6.5 | 7.3 |

TABLE 2-1

|  |  | Example 6 | Example 7 | Example 8 | Example 9 | Example 10 | Example 11 | Example 12 |
|---|---|---|---|---|---|---|---|---|
| Kind of metal fine particle-containing ink | | Ink 6 | Ink 7 | Ink 8 | Ink 9 | Ink 10 | Ink 11 | Ink 12 |
| Kind of metal fine particle dispersion | | dispersion 1 | dispersion 1 | dispersion 1 | dispersion 1 | dispersion 1 | dispersion 1 | dispersion 1 |
| Composition of ink (% by mass) | Metal (silver) | 10.0 | 10.0 | 10.0 | 10.0 | 10.0 | 10.0 | 10.0 |
|  | Polymer B | 1.0 | 1.0 | 1.0 | 1.0 | 1.0 | 1.0 | 1.0 |
|  | Dihydric alcohol C — Propylene glycol | 0.0 | 14.9 | 14.9 | 14.9 | 14.9 | 14.9 | 14.9 |

TABLE 2-1-continued

|  |  | Example 6 | Example 7 | Example 8 | Example 9 | Example 10 | Example 11 | Example 12 |
|---|---|---|---|---|---|---|---|---|
| Hydroxyketone | Monohydroxy acetone | 0.6 | 0.0 | 12.0 | 0.0 | 0.6 | 0.6 | 0.6 |
|  | Dihydroxy acetone |  |  |  | 0.3 |  |  |  |
| Monocarboxylic acid | Acetic acid | 0.3 | 0.3 | 0.3 | 0.3 | 0.0 | 12.0 | 0.0 |
|  | Propionic acid |  |  |  |  |  |  | 0.3 |
| Organic solvent D | Tetrahydrofuran | 58.2 | 73.8 | 61.8 | 73.5 | 73.6 | 61.6 | 73.3 |
|  | Ethanol | 30.0 |  |  |  |  |  |  |
| Total |  | 100.0 | 100.0 | 100.0 | 100.0 | 100.0 | 100.0 | 100.0 |
| Average particle size (nm) of metal fine particles (a) in ink |  | 30 | 30 | 30 | 30 | 30 | 30 | 30 |

TABLE 2-2

|  |  | Example 6 | Example 7 | Example 8 | Example 9 |
|---|---|---|---|---|---|
|  | SP(B) ($(cal/cm^3)^{0.5}$) | 9.86 | 9.86 | 9.86 | 9.86 |
|  | SP(S) ($(cal/cm^3)^{0.5}$) | 9.90 | 9.82 | 10.51 | 9.82 |
|  | $\Delta$SP $|(SP(S) - SP(B))|$ ($(cal/cm^3)^{0.5}$) | 0.04 | 0.04 | 0.65 | 0.04 |
|  | Kind of printing substrate | KA4100PSKR | KA4100PSKR | KA4100PSKR | KA4100PSKR |
|  | Kind of printed material | Printed material 6 | Printed material 7 | Printed material 8 | Printed material 9 |
| Evaluation | Ordinary-temperature sintering properties | Yes | Yes | Yes | Yes |
|  | Volume resistivity $\rho v$ (I) ($\Omega \cdot cm$) immediately after printing | $7.90 \times 10^{-6}$ | $9.20 \times 10^{-6}$ | $7.70 \times 10^{-6}$ | $7.80 \times 10^{-6}$ |
|  | Volume resistivity $\rho v$ (II) ($\Omega \cdot cm$) after being stored under high-temperature and high-humidity conditions | $8.10 \times 10^{-6}$ | $9.75 \times 10^{-6}$ | $8.00 \times 10^{-6}$ | $8.00 \times 10^{-6}$ |
|  | Rate (%) of change in volume resistivity between before and after being stored | 2.5 | 6.0 | 3.9 | 2.6 |

|  |  | Example 10 | Example 11 | Example 12 |
|---|---|---|---|---|
|  | SP(B) ($(cal/cm^3)^{0.5}$) | 9.86 | 9.86 | 9.86 |
|  | SP(S) ($(cal/cm^3)^{0.5}$) | 9.82 | 10.66 | 9.82 |
|  | $\Delta$SP $|(SP(S) - SP(B))|$ ($(cal/cm^3)^{0.5}$) | 0.04 | 0.80 | 0.04 |
|  | Kind of printing substrate | KA4100PSKR | KA4100PSKR | KA4100PSKR |
|  | Kind of printed material | Printed material 10 | Printed material 11 | Printed material 12 |
| Evaluation | Ordinary-temperature sintering properties | Yes | Yes | Yes |
|  | Volume resistivity $\rho v$ (I) ($\Omega \cdot cm$) immediately after printing | $7.70 \times 10^{-6}$ | $7.80 \times 10^{-6}$ | $7.70 \times 10^{-6}$ |
|  | Volume resistivity $\rho v$ (II) ($\Omega \cdot cm$) after being stored under high-temperature and high-humidity conditions | $7.90 \times 10^{-6}$ | $8.03 \times 10^{-6}$ | $7.84 \times 10^{-6}$ |
|  | Rate (%) of change in volume resistivity between before and after being stored | 2.6 | 2.9 | 1.8 |

From the results shown in Table 1, it was confirmed that the respective printed materials obtained in Examples 1 to 12 exhibited ordinary-temperature sintering properties of metal fine particles therein, and were capable of developing high electrical conductivity immediately after printing and maintaining the high electrical conductivity even when being stored under high-temperature and high-humidity conditions since the values of the volume resistivity $\rho v$ (I) and the rate of change in volume resistivity between before and after being stored were small, as compared to the printed materials obtained in Comparative Examples 1 and 2.

On the other hand, it was confirmed that in Comparative Examples 1 and 2, since the metal fine particle-containing inks whose $\Delta$SP was more than 1.5 $(cal/cm^3)^{0.5}$ were used therein, the values of the volume resistivity $\rho v$ (I) and the rate of change in volume resistivity between before and after being stored were large, and the resulting printed materials were deteriorated in electrical conductivity immediately after printing, and failed to suppress deterioration in electrical conductivity when being stored under high-temperature and high-humidity conditions.

INDUSTRIAL APPLICABILITY

According to the present invention, it is possible to obtain a printed material that is capable of developing high electrical conductivity immediately after printing and maintaining the high electrical conductivity even after being stored under high-temperature and high-humidity conditions, and therefore can be suitably used for producing wirings, electrodes, etc., in various application fields.

The invention claimed is:

1. A metal fine particle-containing ink comprising metal fine particles (a) dispersed therein with a polymer B, wherein:
the ink further comprises a solvent S;
a difference $\Delta SP$ ($|SP(S)-SP(B)|$) between solubility parameters of the solvent S and the polymer B is not more than 1.5 $(cal/cm^3)^{0.5}$, wherein SP(S) and SP(B) are solubility parameters of the solvent S and the polymer B, respectively, as measured by a Fedors method; and
the SP(B) is not less than 9.5 $(cal/cm^3)^{0.5}$ and not more than 10.5 $(cal/cm^3)^{0.5}$.

2. The metal fine particle-containing ink according to claim 1, which comprises a dihydric alcohol C as the solvent S, represented by the following general formula (1):

wherein $R^1$ and $R^2$ are respectively a hydrogen atom or a hydrocarbon group having not less than 1 and not more than 3 carbon atoms; $R^3$ is at least one alkylene group selected from the group consisting of an ethylene group and a propylene group; and n is an integer of not less than 0 and not more than 30, with the proviso that in the general formula (1), when $R^1$ and $R^2$ both are both a hydrogen atom, $R^3$ comprises at least a propylene group, and n is not less than 1.

3. The metal fine particle-containing ink according to claim 2, wherein a content of the dihydric alcohol C in the metal fine particle-containing ink is not less than 3% by mass and not more than 40% by mass.

4. The metal fine particle-containing ink according to claim 2, wherein a mass ratio of the dihydric alcohol C to the metal [dihydric alcohol C/metal] in the metal fine particle-containing ink is not less than 0.5 and not more than 4.

5. The metal fine particle-containing ink according to claim 1, which comprises a hydroxyketone.

6. The metal fine particle-containing ink according to claim 1, which comprises a monocarboxylic acid having not less than 1 and not more than 24 carbon atoms.

7. The metal fine particle-containing ink according to claim 1, wherein the SP(S) is not more than 10.0 $(cal/cm^3)^{0.5}$.

8. The metal fine particle-containing ink according to claim 1, which comprises at least one organic solvent D selected from the group consisting of acetone, methyl ethyl ketone, tetrahydrofuran and ethyl acetate, as the solvent S.

9. The metal fine particle-containing ink according to claim 1, wherein the polymer B is a vinyl polymer comprising a constitutional unit derived from a monomer (b-1) comprising a polyalkylene glycol segment.

10. The metal fine particle-containing ink according to claim 9, wherein the polymer B is the vinyl polymer further comprising a constitutional unit derived from a monomer (b-2) comprising a carboxy group.

11. A method for producing a printed material, the method comprising applying the metal fine particle-containing ink according to claim 1 to a printing substrate to form a metal coating film of the ink on the printing substrate under ordinary-temperature environments, thereby obtaining the printed material.

12. The method for producing a printed material according to claim 11, wherein a volume resistivity $\rho v$ (II) of the metal coating film as measured after storing the printed material under environmental conditions of a temperature of 80° C. and a relative humidity of 80% RH for 30 days is not more than $5 \times 10^{-5}$ $\Omega \cdot cm$.

13. The metal fine particle-containing ink according to claim 1, wherein the SP(S) is not less than 8.5 $(cal/cm^3)^{0.5}$ and not more than 11.5 $(cal/cm^3)^{0.5}$.

14. The metal fine particle-containing ink according to claim 1, which comprises an organic solvent D as the solvent S, and the solubility parameter SP(D) of the organic solvent D as measured by a Fedors method is not less than 7.0 $(cal/cm^3)^{0.5}$ and not more than 11.0 $(cal/cm^3)^{0.5}$.

15. The metal fine particle-containing ink according to claim 14, wherein a content of the organic solvent D in the metal fine particle-containing ink is not less than 20% by mass and not more than 90% by mass.

16. The metal fine particle-containing ink according to claim 1, wherein the metal constituting the metal fine particles (a) is silver.

17. The metal fine particle-containing ink according to claim 1, wherein a mass ratio of the polymer B to a sum of the polymer B and the metal [polymer B/(polymer B+metal)] in the metal fine particle-containing ink is not less than 0.01 and not more than 0.3.

18. The metal fine particle-containing ink according to claim 1, wherein a content of the metal in the metal fine particle-containing ink is not less than 1% by mass and not more than 55% by mass.

19. A metal fine particle-containing ink comprising metal fine particles (a) dispersed therein with a polymer B, wherein:
the ink further comprises a solvent S;
a difference $\Delta SP$ ($|SP(S)-SP(B)|$) between solubility parameters of the solvent S and the polymer B is not more than 1.5 $(cal/cm^3)^{0.5}$, wherein SP(S) and SP(B) are solubility parameters of the solvent S and the polymer B, respectively, as measured by a Fedors method;
the SP(B) is not less than 9.5 $(cal/cm^3)^{0.5}$ and not more than 10.5 $(cal/cm^3)^{0.5}$;
the SP(S) is not less than 8.5 $(cal/cm^3)^{0.5}$ and not more than 11.5 $(cal/cm^3)^{0.5}$;
the metal fine particle-containing ink comprises a dihydric alcohol C, represented by the following formula (1), and an organic solvent D, as the solvent S:

wherein $R^1$ and $R^2$ are respectively a hydrogen atom or a hydrocarbon group having not less than 1 and not more than 3 carbon atoms; $R^3$ is at least one alkylene group selected from the group consisting of an ethylene group and a propylene group; and n is an integer of not less than 0 and not more than 30, with the proviso that in the general formula (1), when $R^1$ and $R^2$ are both a hydrogen atom, $R^3$ comprises at least a propylene group, and n is not less than 1;

the organic solvent D comprises at least one solvent selected from the group consisting of acetone, methyl ethyl ketone, tetrahydrofuran and ethyl acetate; and the polymer B is a vinyl polymer comprising a constitutional unit derived from a monomer (b-1) comprising a polyalkylene glycol segment and a constitutional unit derived from a monomer (b-2) comprising a carboxy group.

* * * * *